(12) United States Patent
Umeda

(10) Patent No.: US 8,639,030 B2
(45) Date of Patent: Jan. 28, 2014

(54) IMAGE PROCESSING USING AN ADAPTATION RATE

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 12/962,868

(22) Filed: Dec. 8, 2010

(65) Prior Publication Data

US 2011/0286665 A1  Nov. 24, 2011

(30) Foreign Application Priority Data

May 24, 2010  (JP) ................................. 2010-118771

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| | | | |
|---|---|---|---|
| 5,218,387 A | 6/1993 | Ueno et al. | |
| 5,905,807 A | 5/1999 | Kado et al. | |
| 6,459,436 B1 | 10/2002 | Kumada et al. | 345/590 |
| 6,885,760 B2 | 4/2005 | Yamada et al. | |
| 6,895,103 B2 | 5/2005 | Chen et al. | |
| 6,965,684 B2 | 11/2005 | Chen et al. | |
| 7,139,425 B2 | 11/2006 | Takahashi | |
| 2004/0126012 A1 | 7/2004 | Sakaida | 382/167 |
| 2004/0201727 A1 | 10/2004 | Ichikawa et al. | 348/223.1 |
| 2005/0169519 A1* | 8/2005 | Minakuti et al. | 382/162 |
| 2008/0279451 A1* | 11/2008 | Shimbaru | 382/167 |
| 2009/0034838 A1 | 2/2009 | Umeda et al. | 382/167 |
| 2010/0165137 A1* | 7/2010 | Koishi | 348/222.1 |
| 2010/0295998 A1 | 11/2010 | Sakai et al. | 348/700 |
| 2011/0007181 A1* | 1/2011 | Ishigami et al. | 348/223.1 |

FOREIGN PATENT DOCUMENTS

| | | |
|---|---|---|
| EP | 1185082 | 3/2002 |
| JP | 5-197793 | 8/1993 |
| JP | 8-63597 | 3/1996 |
| JP | 8-77334 | 3/1996 |
| JP | 2541688 | 10/1996 |
| JP | 11-53525 | 2/1999 |
| JP | 11-250267 | 9/1999 |

(Continued)

OTHER PUBLICATIONS

Mark D. Fairchild, "A revision of CIECAM97s for practical applications", Color Research & Application, vol. 26, Issue 6, pp. 418-427, Dec. 2001.*
U.S. Appl. No. 12/962,889, filed Dec. 8, 2010 by Hiroyuki Sakai, et al.
U.S. Appl. No. 12/962,875, filed Dec. 8, 2010 by Kiyoshi Umeda, et al.

(Continued)

*Primary Examiner* — Li Liu
(74) *Attorney, Agent, or Firm* — Fitzpatrick, Cella, Harper & Scinto

(57) ABSTRACT

An image processing apparatus which corrects color balance of an image in image data captured by an image capturing apparatus having a color balance correction function, the apparatus comprises a light source estimation unit configured to estimate a capturing light source of the image based on a color value of an object; a first color conversion unit configured to perform first color conversion of converting, based on the capturing light source and the color value, the image into an image in which color balance correction applied depending on the image capturing apparatus that has captured the image data containing the image is weakened; and a second color conversion unit configured to perform second color conversion for the image having undergone the first color conversion, by using an adaptation rate corresponding to a color value defined based on chromatic adaptation of a man under the capturing light source.

23 Claims, 15 Drawing Sheets

(56) References Cited

FOREIGN PATENT DOCUMENTS

| JP | 2000-105829 | 4/2000 |
|----|-------------|--------|
| JP | 2000-132688 | 5/2000 |
| JP | 2000-235648 | 8/2000 |
| JP | 2001-216515 | 8/2001 |
| JP | 2002-152772 | 5/2002 |
| JP | 2002-183731 | 6/2002 |
| JP | 2003-30667  | 1/2003 |

OTHER PUBLICATIONS

U.S. Appl. No. 12/962,895, filed Dec. 8, 2010 by Junichi Nakagawa, et al.
European Search Report dated May 22, 2012 in corresponding European Application No. 10195131.7.
Moroney et al., "The CIECAM02 Color Appearance Model", IS&T/SID Tenth Color Imaging Conference, 2002, pp. 23-27.
Alessi et al., "A Color Appearance Model for Colour Management Systems: CIECAM02", CIE Technical Report, 2004, pp. 2-26.

* cited by examiner

F I G. 8
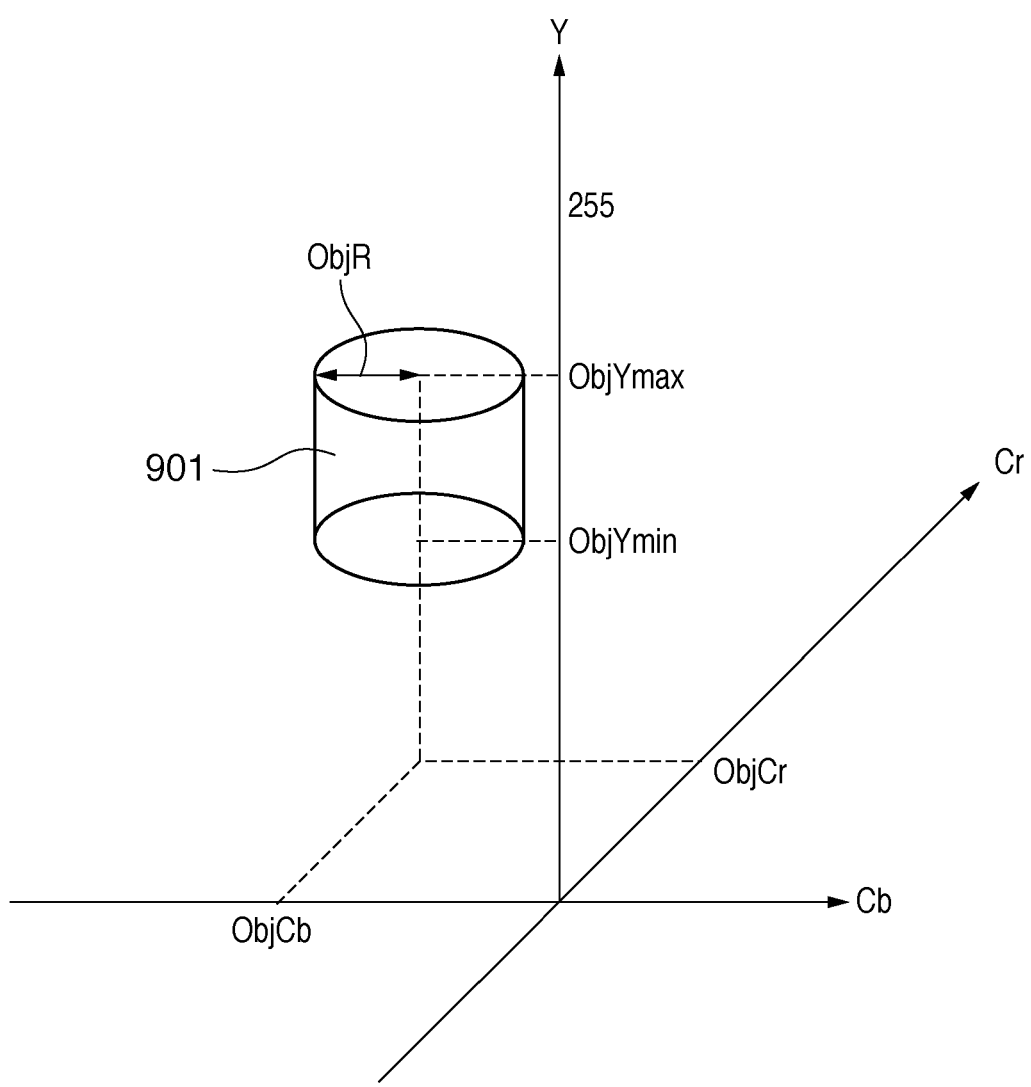

| REFERENCE COLOR TEMPERATURE [KELVIN] | Y, Cb, AND Cr VALUES OF WHITE POINT | | |
|---|---|---|---|
| | Y | Cb | Cr |
| 2000 | 255 | -30 | 30 |
| 5500 | 255 | 0 | 0 |
| 10000 | 255 | 20 | -20 |

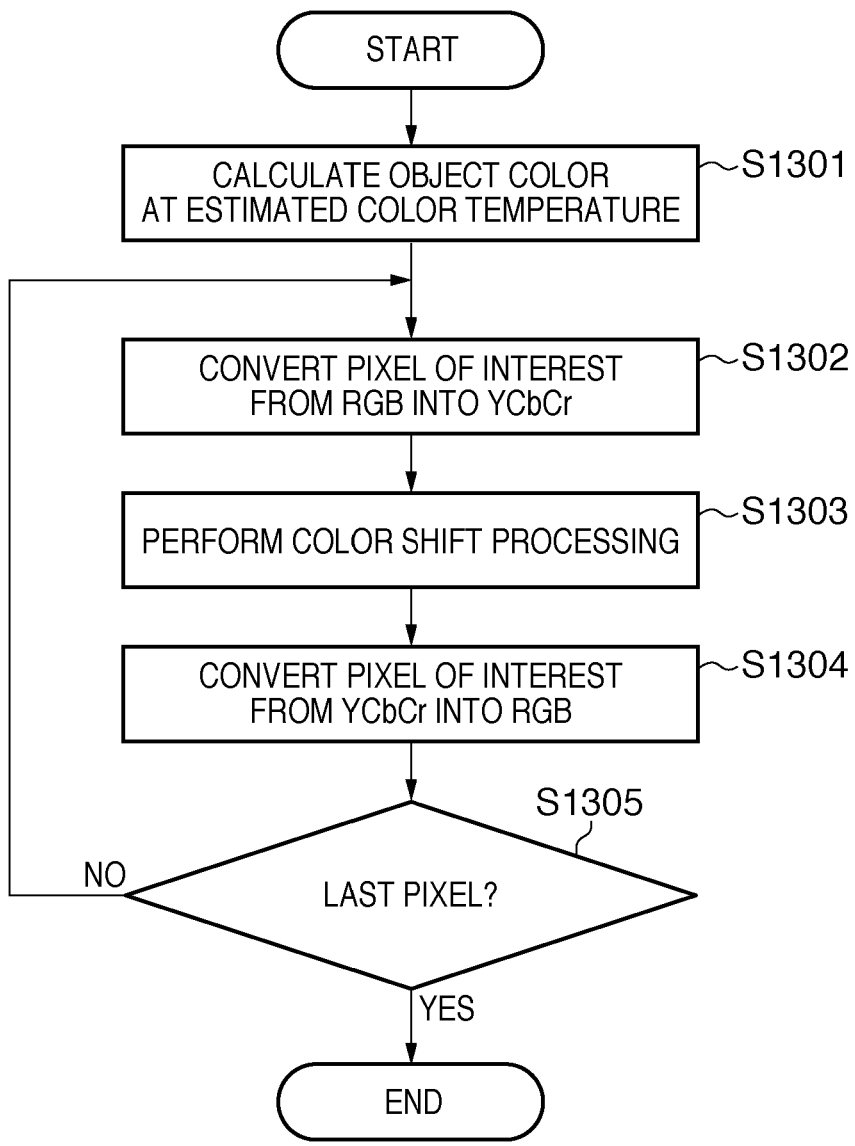

IMAGE PROCESSING USING AN ADAPTATION RATE

BACKGROUND OF THE INVENTION

1. Field of the Invention

The present invention relates to an image processing apparatus, control method, and computer-readable medium for estimating the color temperature of a capturing light source for input digital image data, and correcting the color balance of the image in accordance with the color temperature.

2. Description of the Related Art

There has conventionally been proposed a method of estimating a capturing light source and correcting the color balance for image data captured by a digital camera or image data obtained by optically scanning a film on which an analog camera captures an image.

In a method disclosed in Japanese Patent Laid-Open No. 2002-152772, the blackbody locus of gray and the skin color based on the typical spectral distribution of a camera is held in advance. To perform inverse conversion of color balance correction of a camera, the R, G, and B components of respective pixels are multiplied by various coefficients. The number of pixels present near the blackbody locus among pixels after the conversion is evaluated to estimate a capturing light source. After estimating the light source, the converted image is converted into a color under a predetermined light source.

This color balance correction method has the following problem. In Japanese Patent Laid-Open No. 2002-152772, the image is only converted into a color under a predetermined light source after estimating the light source. In this case, "appearance" visually recognized by the photographer in the moment of capturing is not reproduced.

The human eye has a chromatic adaptation function. For example, when a man stays under daylight (color temperature of about 5,500 K (kelvins)) for a while and then enters a room equipped with an incandescent lamp (color temperature of about 3,000 K), a white object seems orangey immediately after he enters the room. However, the object seems almost achromatic after a while. This is chromatic adaptation which acts when illumination light is colored, in order to maintain appearance under daylight by performing different sensitivity adjustments by three cones (L, M, and S) of the human eye.

However, chromatic adaptation is known not to act perfectly. More specifically, when a man stays in a room equipped with an incandescent lamp for a long time, a white object seems almost achromatic but not completely achromatic. This is called incomplete adaptation.

In this way, the human eye perceives an object in an incompletely adapted state under the illumination light source. For this reason, an image after color balance correction differs from one actually perceived by the human eye unless "appearance" on the moment is reproduced, and the user feels the corrected image to be unnatural. To solve this problem, it is desirable to estimate a capturing light source, and perform color balance correction considering the human visual characteristic under the light source. However, no such proposal has been made.

SUMMARY OF THE INVENTION

According to one aspect of the present invention, there is provided an image processing apparatus which corrects color balance of an image in image data captured by an image capturing apparatus having a color balance correction function, the apparatus comprising: a detection unit configured to detect an object contained in the image; an analysis unit configured to analyze a color value of the object detected by the detection unit; a light source estimation unit configured to estimate a capturing light source of the image based on the color value analyzed by the analysis unit; a first color conversion unit configured to perform first color conversion of converting, based on the capturing light source estimated by the light source estimation unit and the color value analyzed by the analysis unit, the image into an image in which color balance correction applied depending on the image capturing apparatus that has captured the image data containing the image is weakened; and a second color conversion unit configured to perform second color conversion for the image having undergone the first color conversion by the first color conversion unit, by using an adaptation rate corresponding to a color value defined based on chromatic adaptation of a man under the capturing light source.

According to another aspect of the present invention, there is provided an image processing apparatus which corrects color balance of an image in image data captured by an image capturing apparatus having a color balance correction function, the apparatus comprising: a detection unit configured to detect an object contained in the image; an analysis unit configured to analyze a color value of the object detected by the detection unit; a light source estimation unit configured to estimate a capturing light source of the image based on the color value analyzed by the analysis unit; a first calculation unit configured to calculate a first color conversion parameter used when converting, based on the capturing light source estimated by the light source estimation unit and the color value analyzed by the analysis unit, the image into an image in which color balance correction applied depending on the image capturing apparatus that has captured the image data containing the image is weakened; a second calculation unit configured to calculate a second color conversion parameter used when performing color conversion using an adaptation rate corresponding to a color value defined based on chromatic adaptation of a man under the capturing light source; a generation unit configured to generate a multi-dimensional LUT using the first color conversion parameter and the second color conversion parameter; and an interpolation unit configured to interpolate a color value of the image using the multi-dimensional LUT.

According to another aspect of the present invention, there is provided a method of controlling an image processing apparatus which corrects color balance of an image in image data captured by an image capturing apparatus having a color balance correction function, the method comprising: a detection step of causing a detection unit of the image processing apparatus to detect an object contained in the image; an analysis step of causing an analysis unit of the image processing apparatus to analyze a color value of the object detected in the detection step; a light source estimation step of causing a light source estimation unit of the image processing apparatus to estimate a capturing light source of the image based on the color value analyzed in the analysis step; a first color conversion step of causing a first color conversion unit of the image processing apparatus to perform first color conversion of converting, based on the capturing light source estimated in the light source estimation step and the color value analyzed in the analysis step, the image into an image in which color balance correction applied depending on the image capturing apparatus that has captured the image data containing the image is weakened; and a second color conversion step of causing a second color conversion unit of the image processing apparatus to perform second color conversion for the image having undergone the first color conversion in the first color conversion step, by using an adaptation rate corresponding to a color value defined based on chromatic adaptation of a man under the capturing light source.

According to another aspect of the present invention, there is provided a method of controlling an image processing apparatus which corrects color balance of an image in image data captured by an image capturing apparatus having a color balance correction function, the method comprising: a detection step of causing a detection unit of the image processing apparatus to detect an object contained in the image; an analysis step of causing an analysis unit of the image processing apparatus to analyze a color value of the object detected in the detection step; a light source estimation step of causing a light source estimation unit of the image processing apparatus to estimate a capturing light source of the image based on the color value analyzed in the analysis step; a first calculation step of causing a first calculation unit of the image processing apparatus to calculate a first color conversion parameter used when converting, based on the capturing light source estimated in the light source estimation step and the color value analyzed in the analysis step, the image into an image in which color balance correction applied depending on the image capturing apparatus that has captured the image data containing the image is weakened; a second calculation step of causing a second calculation unit of the image processing apparatus to calculate a second color conversion parameter used when performing color conversion using an adaptation rate corresponding to a color value defined based on chromatic adaptation of a man under the capturing light source; a generation step of causing a generation unit of the image processing apparatus to generate a multi-dimensional LUT using the first color conversion parameter and the second color conversion parameter; and an interpolation step of causing an interpolation unit of the image processing apparatus to interpolate a color value of the image using the multi-dimensional LUT.

The present invention can estimate the capturing light source of an input image, and implement color balance correction based on the human visual characteristic under the light source. The present invention enables color conversion considering even incomplete chromatic adaptation out of human visual characteristics. The present invention can, therefore, display a photographic image or obtain an output, which more faithfully reproduces the atmosphere in capturing, compared to the conventional technique.

Further features of the present invention will become apparent from the following description of exemplary embodiments (with reference to the attached drawings).

BRIEF DESCRIPTION OF THE DRAWINGS

FIG. 8 is a graph for explaining processing of specifying a skin color pixel according to the present invention;

FIG. 12 is a flowchart of the first color conversion unit according to the third embodiment;

DESCRIPTION OF THE EMBODIMENTS

First Embodiment

The first embodiment in the present invention will be described. The following description assumes image processing within the main body of an image processing apparatus. However, this is merely an embodiment, and the present invention is not limited to the following embodiment.

(Description of Hardware Configuration)

Figure 1:
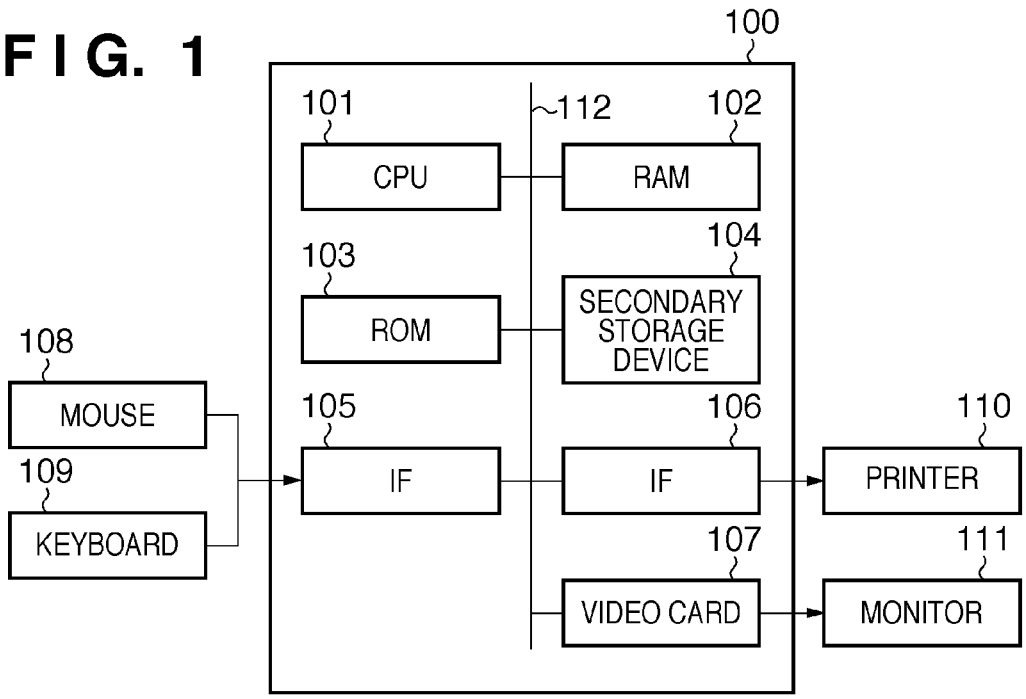
FIG. 1 is a block diagram showing a hardware configuration for executing an image processing method according to the present invention.

FIG. 1 shows a hardware configuration 100 capable of executing an image processing method according to the present invention. Note that FIG. 1 shows an example in the embodiment, and the present invention is not limited to the configuration in FIG. 1.

Referring to FIG. 1, a printer to which the present invention is applicable includes a CPU 101, RAM 102, and ROM 103, and respective functional blocks are connected to a system bus 112. A program code which executes an operation in the embodiment is stored in the ROM 103, and in operation, loaded into the RAM 102 and executed by the CPU 101.

A mouse 108 and keyboard 109 are connected via an interface 105 to a secondary storage device 104 such as an HDD or flash memory. Also, a printer 110 is connected via an interface 106, and a monitor 111 for displaying images before and after correction for evaluation is connected via a video card 107.

(Description of Overall Processing Sequence)

The overall sequence of image processing in the first embodiment will be explained with reference to FIG. 2. In the first embodiment, an input image 200 is assumed to be, for example, a digital image captured by a digital camera or a digital image obtained by optically scanning a film on which an analog camera captures an image. Although the embodiment does not particularly limit the data format of the input image 200, the color space of the input image 200 is the sRGB (standard RGB) color space, and each pixel value is given by R, G, and B component values of 8 bits in the embodiment for descriptive convenience.

An object detection unit 201 receives the input image 200 and detects a subject of interest (object of interest) from the image. The embodiment will exemplify a human face as the object of interest, but is not limited to this. After the object is detected, an object color calculation unit 202 calculates the color of the detected object. A light source estimation unit 204 receives the calculated object color information.

An HL color calculation unit 203 also receives the input image 200 and calculates the highlight color (to be referred to as HL color) of the image, thereby implementing a highlight color calculation unit. The HL color is the color of the brightest region (pixel) of the image. The light source estimation unit 204 also receives the HL color, similar to the object color.

The light source estimation unit 204 estimates a capturing light source based on the input HL color and object color. The embodiment does not particularly limit the capturing light source estimation method, and one of the methods disclosed in Japanese Patent Laid-Open No. 2002-152772 in Description of the Related Art and the like is usable.

After estimating a capturing light source, the light source estimation unit 204 determines, for example, the color temperature value of the capturing light source, and outputs the determined color temperature value to a first color conversion unit 205. In general, a digital camera (image capturing apparatus) has a color balance correction function, and an image captured by the digital camera undergoes unique color balance correction within the camera. Hence, the first color conversion unit 205 cancels color balance correction executed by the digital camera for the image, and converts the input image 200 into a state before color balance correction.

A second color conversion unit 206 receives the image having undergone the first color conversion, and performs the second color conversion processing. The second color conversion unit 206 performs color conversion for the image in which color balance correction executed in the camera has been canceled by the first color conversion unit 205, so as to come close to "appearance" under the capturing light source. The image having undergone the second color conversion by the second color conversion unit 206 is stored as an output image in the secondary storage device 104, displayed on the monitor 111, or printed on a printing medium by the printer 110. The processing blocks in the first embodiment have been described. Details of processing will be explained with reference to a flowchart for the operation of each unit shown in FIG. 2.

(Details of Each Unit: Object Detection Unit and Object Color Calculation Unit)

The object detection unit 201 performs processing of detecting a main subject in the input image 200. A typical example of the main subject serving as an object is a human face. As the human face detection method, various methods have already been proposed.

For example, in a method described in Japanese Patent Laid-Open No. 2002-183731, an eye region is detected from an input image, and a region around the eye region is set as a face candidate region. The luminance gradient of each pixel and the weight of the luminance gradient are calculated for the detected face candidate region, and these values are compared with the gradient of a preset ideal face reference image and the weight of the gradient. At this time, if the average angle between the gradients is equal to, or smaller than a predetermined threshold, it is determined that the input image has a face region. In addition, in Japanese Patent Laid-Open No. 2003-30667, a skin color region having the skin color of a man is detected from an image, and a human iris color pixel is detected in this region, thereby detecting eye positions.

In Japanese Patent Laid-Open No. 8-63597, the degree of matching between each of templates having a plurality of face shapes, and an image is calculated, and a template having the highest degree of matching is selected. If the highest degree of matching is equal to or higher than a predetermined threshold, the region within the selected template is determined as a face candidate region. By using this template, eye positions can be detected.

Further, in Japanese Patent Laid-Open No. 2000-105829, an entire image or a region designated in the image is scanned using a nose image pattern as a template, and a position which most matches the template is output as a nose position. A region above the nose position in the image is regarded as a region where eyes exist, and the eye presence region is scanned for matching using an eye image pattern as a template, thereby obtaining an eye presence candidate position set serving as a set of pixels whose degree of matching is higher than a given threshold. Then, a continuous region contained in the eye presence candidate position set is divided into clusters, and the distance between each cluster and the nose position is calculated. A cluster having the shortest distance is determined as a cluster where the eye exists. In this manner, the position of an organ can be detected.

As other methods of detecting a face and organ position, many methods have been proposed, including those disclosed in Japanese Patent Laid-Open Nos. 8-77334, 2001-216515, 5-197793, 11-53525, 2000-132688, 2000-235648, and 11-250267 and Japanese Patent No. 2541688. The embodiment does not particularly limit the method, and any of the above-described methods is applicable.

If object detection by the object detection unit 201 is successful, coordinates indicating the position of a main subject can be obtained. The coordinates may be those of a rectangle containing a face region, or those of a circle expressed by the center and radius. The object color calculation unit 202 receives the obtained coordinate information, and analyzes the color of the main subject region. Color analysis generally means the average color in a detected main subject region. For example, when each pixel which forms an image is expressed by R, G, and B values, the average color can be obtained by calculating the averages of the R, G, and B values of pixels contained in the main subject region.

In the embodiment, the object color obtained by the above method is handled as (ObjR, ObjG, ObjB) for descriptive convenience. (ObjY, ObjCb, ObjCr) obtained by converting the object color into the YCbCr color space is similarly handled as the object color.

As another method of acquiring an object color, it is also possible to convert the R, G, and B values of pixels contained in the main subject region into luminance and color difference components, and calculate the average value of the color difference components. The luminance/color difference space may be, for example, the YC1C2 space or CIE L*a*b* space. When the object detection unit 201 detects a plurality of main subjects, average colors calculated for the respective subject regions may be further averaged. To enhance the correction effect, an object color present farthest from a preset ideal object color may be set as a reference. By contrast, to weaken the correction effect, a main subject closest to the ideal object color may be set as a reference.

(Details of Each Unit: Calculation of HL Color of Image)

Figure 2:
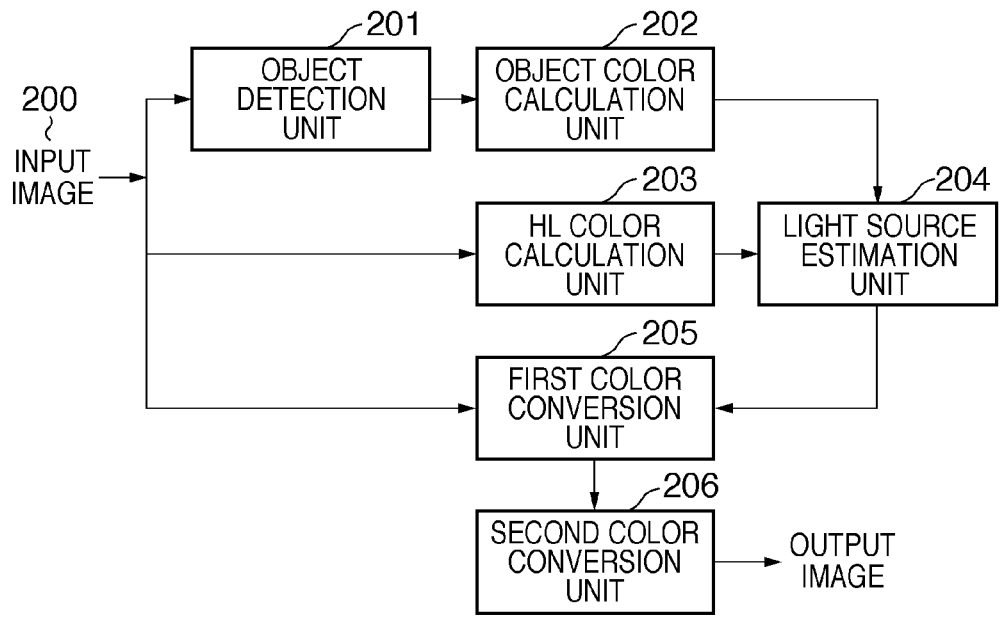
FIG. 2 is a functional block diagram according to the first embodiment.

The HL color calculation unit 203 shown in FIG. 2 calculates the HL color of the input image 200. As for the HL color calculation method, various methods have been proposed, and the embodiment can use any method. The embodiment will explain a method of calculating the HL color based on a sequence shown in FIG. 3.

Figure 3:
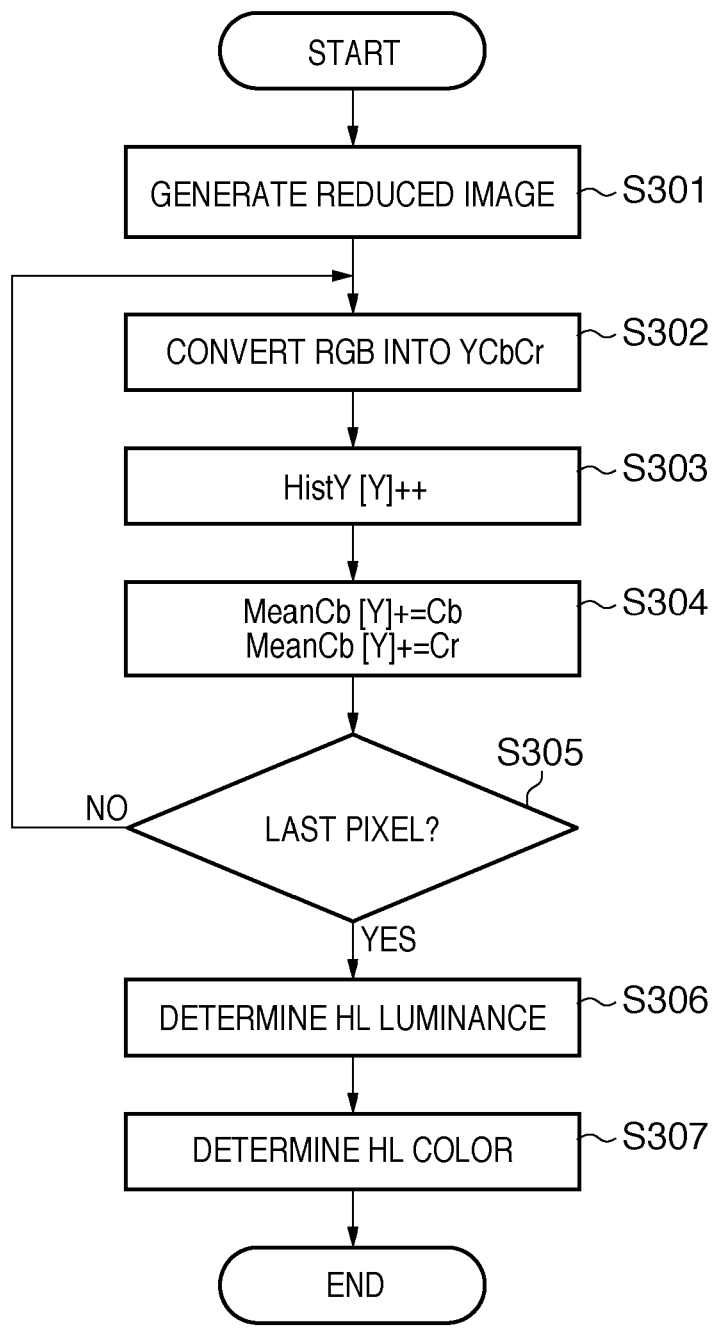
FIG. 3 is a flowchart of a histogram calculation unit according to the first embodiment.

In step S301 of FIG. 3, the HL color calculation unit 203 reduces the input image 200, generating a reduced image for image analysis. The reduced image can have a VGA size (640×480 pixels). Most recent image capturing apparatuses have a resolution of more than 10,000,000 pixels, and analysis processing executed for a high-resolution image may decrease the processing speed. The embodiment suppresses the decrease in processing speed by performing image analysis for a reduced image.

In steps S302 to S305, the HL color calculation unit 203 calculates the histogram of the reduced image. To calculate the histogram, in step S302, the HL color calculation unit 203 converts the R, G, and B values of each pixel in the reduced image into luminance and color difference components in accordance with a known formula. As a conversion example, the R, G, and B values are converted into Y, Cb, and Cr values. Then, in step S303, the HL color calculation unit 203 calculates the frequency histogram of the luminance component Y. The histogram is calculated by incrementing the Yth element of HistY for the HistY array initialized to 0.

In step S304, to calculate the average values of the color difference Cb and Cr values for each luminance, the HL color calculation unit 203 performs calculation for arrays MeanCb and MeanCr whose values are initialized to 0, in accordance with equation (1):

$$\text{Mean}Cb[Y]+=Cb$$

$$\text{Mean}Cr[Y]+=Cr \quad (1)$$

Figure 4:
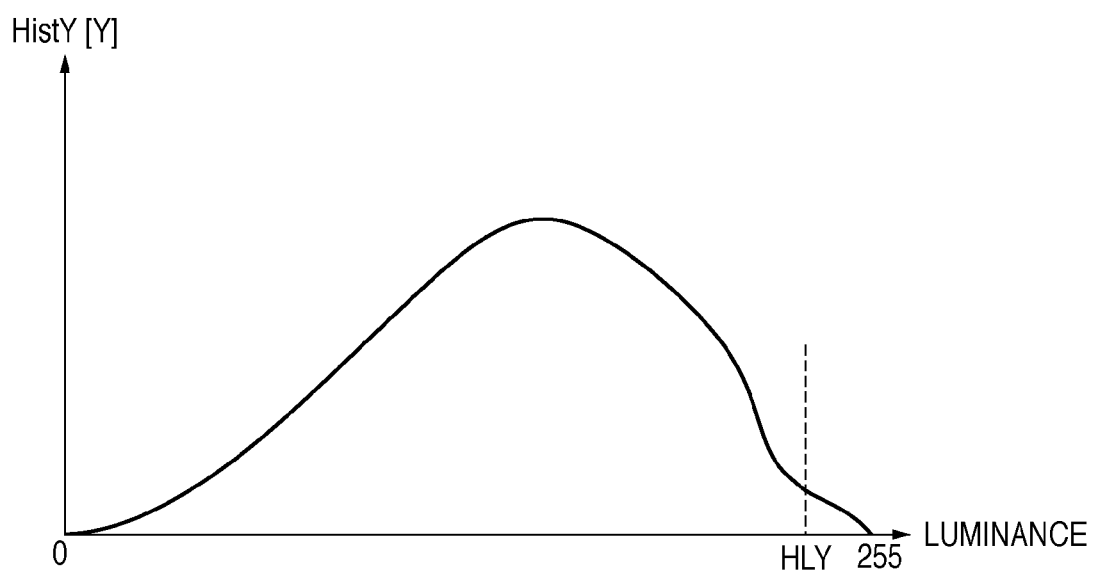
FIG. 4 is a graph for explaining processing of determining a highlight luminance value.

After the end of the processes in steps S302 to S305 for all the pixels of the reduced image, the luminance histogram array HistY stores a frequency distribution as shown in FIG. 4. In step S306, the HL color calculation unit 203 determines a highlight luminance value HLY using HistY. In the embodiment, HistY[Y] values are accumulated from lower luminances, and a luminance value Y obtained when the cumulative frequency reaches 99% of the entire reduced image is determined as the highlight luminance value HLY. Note that the ratio of the cumulative frequency for determining HLY is not limited to 99%, and may be experimentally defined in accordance with the image characteristic and the like.

In step S307, the HL color calculation unit 203 calculates the color HLCb and HLCr values of the HL region using the determined HLY. These values are calculated in accordance with equation (2):

$$HLCb=\text{Mean}Cb[HLY]\div\text{Hist}Y[HLY]$$

$$HLCr=\text{Mean}Cr[HLY]\div\text{Hist}Y[HLY] \quad (2)$$

The HL color calculation unit 203 inputs the calculated HLCb and HLCr values to the light source estimation unit 204.

(Details of Each Unit: Estimation of Light Source)

Details of the light source estimation unit 204 will be described with reference to the flowchart of FIG. 5. The embodiment does not particularly limit a method of estimating the type of capturing light source or the color temperature from an input image. The processing will be exemplified.

Figure 5:
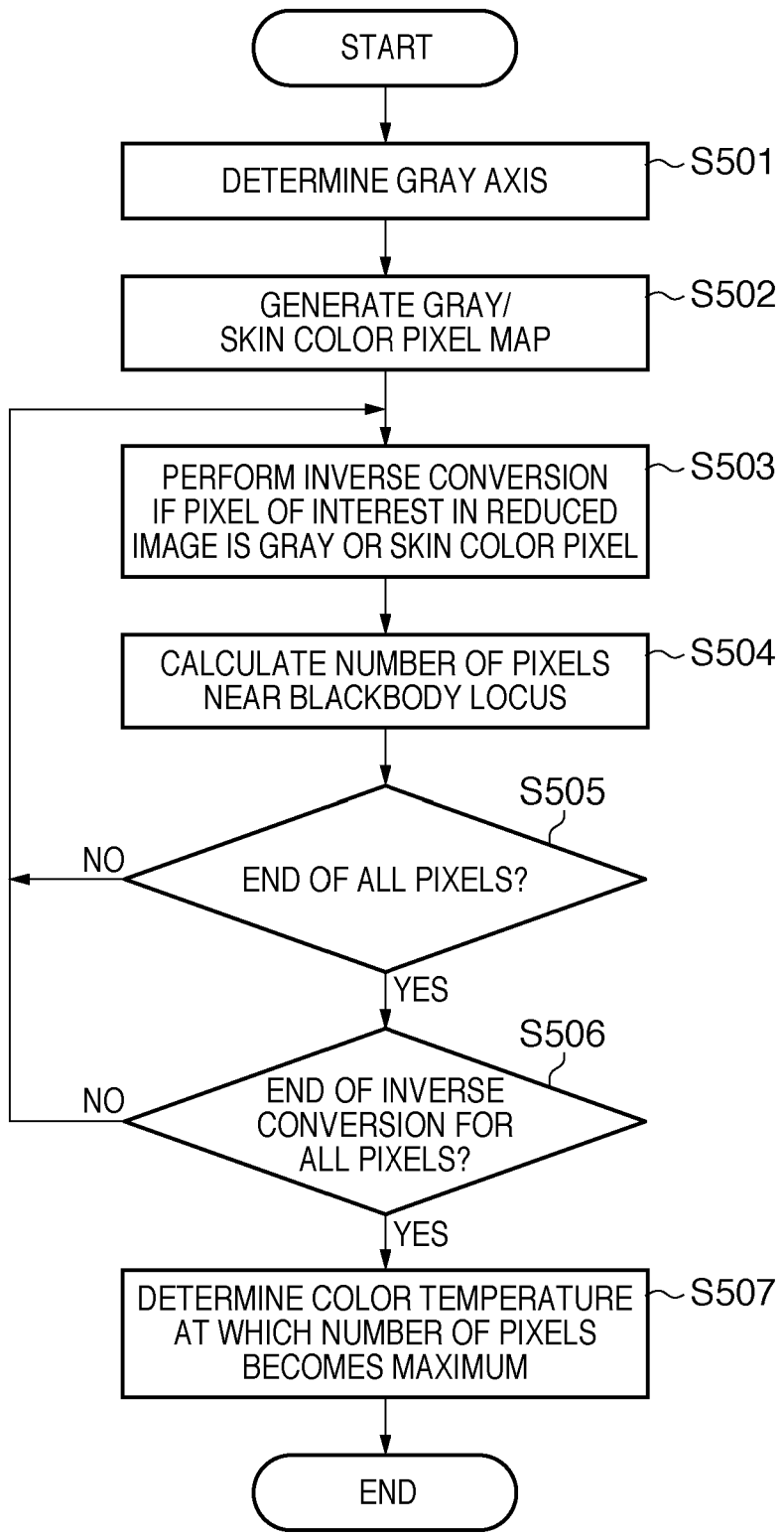
FIG. 5 is a flowchart of light source estimation processing according to the first embodiment.

In step S501 of FIG. 5, the light source estimation unit 204 determines the gray axis in the input image 200. The gray axis is determined as shown in FIGS. 6A and 6B using HLCb and HLCr which have been obtained by the HL color calculation unit 203 and represent the color of the highlight region.

Figure 6A:
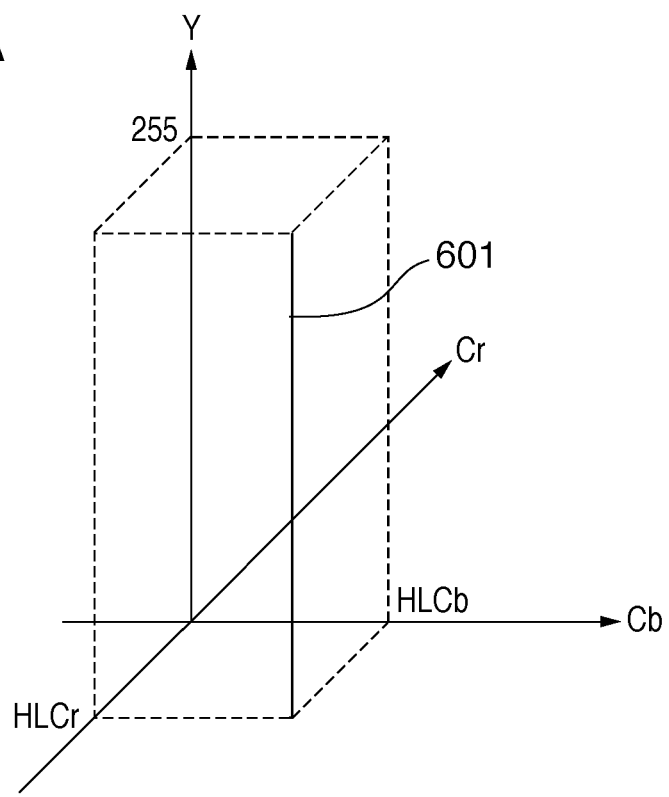
FIGS. 6A and 6B are graphs exemplifying the setting of the gray axis by a light source estimation unit according to the present invention.
Figure 6B:
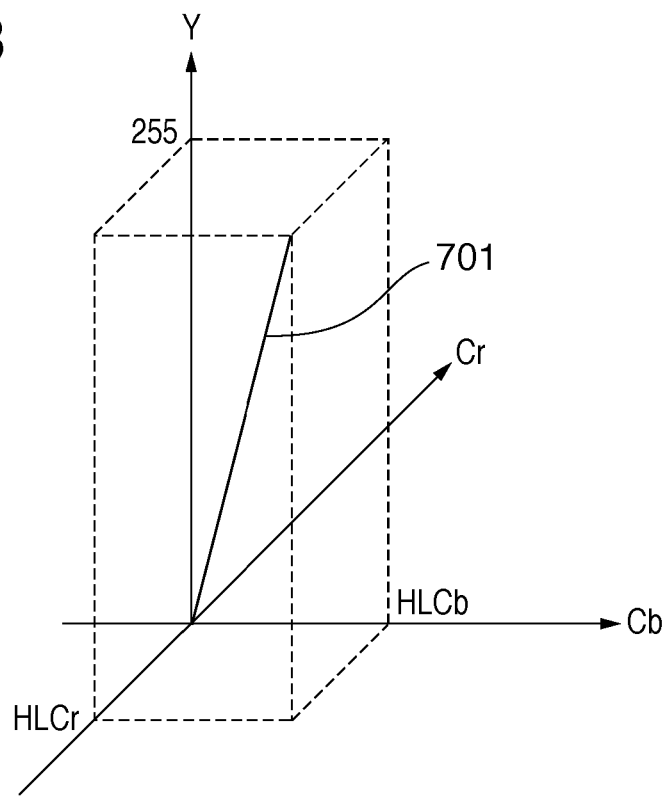

As the gray axis, a straight line 601 perpendicular to the Cb-Cr color plane is set in the YCbCr color space, as shown in FIG. 6A. Alternatively, as shown in FIG. 6B, a straight line 701 indicating (Cb=HLCb, Cr=HLCr) for Y=255 and (Cb=0, Cr=0) for Y=0 may be set as the gray axis. It is generally considered that the dark part of an image is hardly affected by the light source because light does not reach the light-receiving element of the image capturing apparatus. From this, the light source estimation precision is sometimes increased by setting the gray axis as shown in FIG. 6B depending on the characteristics of the image capturing apparatus.

Figure 7:
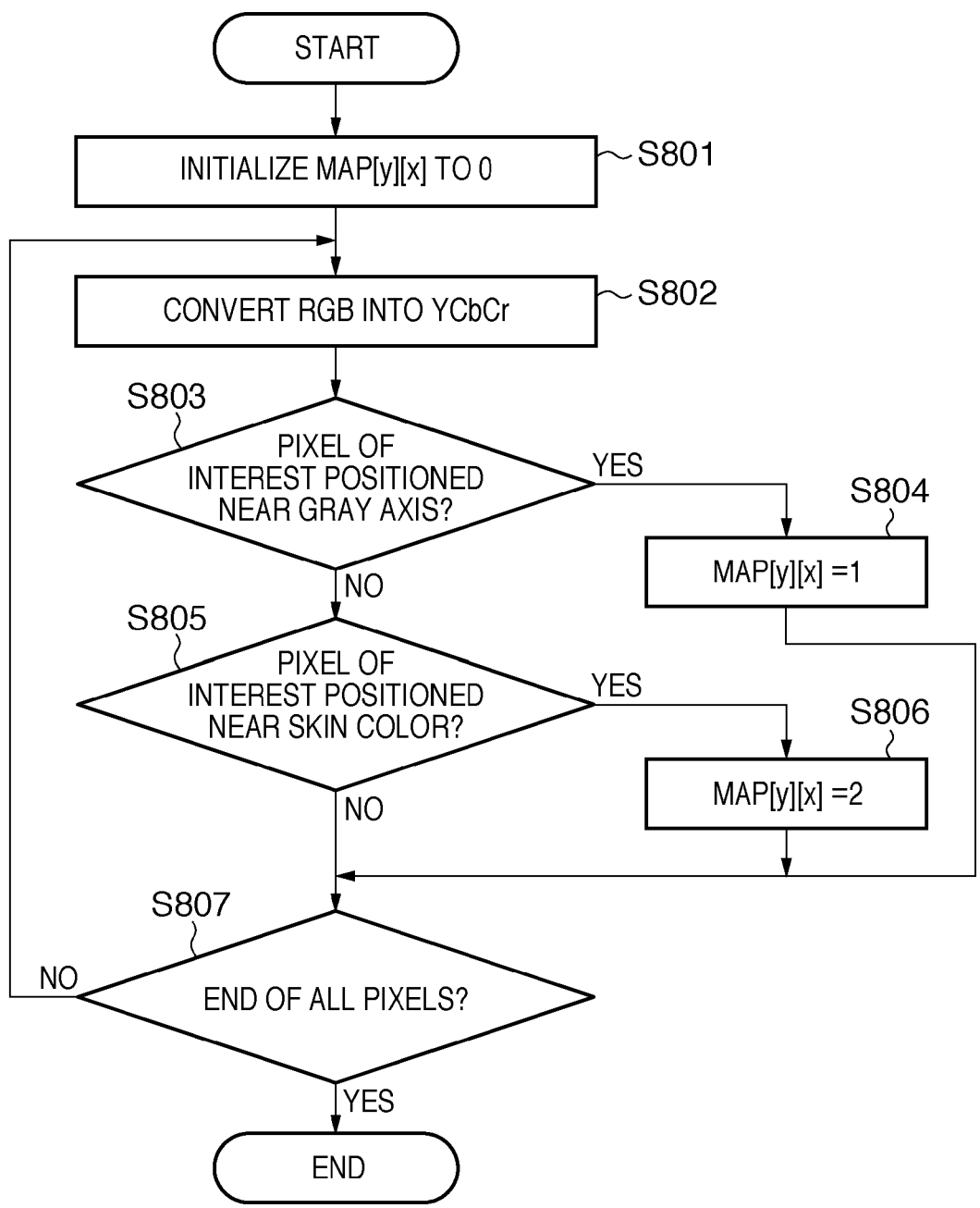
FIG. 7 is a flowchart of gray/skin color map creation processing by the light source estimation unit according to the present invention.

In step S502, the light source estimation unit 204 extracts object color pixels and gray pixels from the input image 200, creating a map. The map is created in accordance with the sequence of FIG. 7. Note that the image to undergo light source estimation may be the input image 200, but the resolution of the input image 200 is high, as described above. Thus, the light source is estimated using a reduced image generated for histogram calculation, shortening the light source estimation processing time. By reusing a reduced image in another processing, the time taken to generate a reduced image again can be omitted.

In step S801, each element of a gray/skin color map MAP [y] [x] is initialized to 0. In step S802, the R, G, and B component values of the pixel of interest in a reduced image to be processed are converted into Y, Cb, and Cr values. In step S803, by referring to the gray axis set in the YCbCr space in FIG. 6A or 6B, the distance of a point indicated by the Y, CB, and Cr values of the pixel of interest from the gray axis is calculated according to a known method of obtaining the distance between a point and a straight line. If the calculated distance is smaller than a predetermined threshold, the pixel of interest is positioned near the gray axis (YES in step S803), and a member corresponding to the position of the pixel of interest in the 2D array MAP[y] [x] prepared with the same width and height as those of the reduced image is set to "1" in step S804.

If it is determined that the pixel of interest is not positioned near the gray axis (NO in step S803), it is determined in step S805 whether the pixel of interest is positioned near the skin color. In the embodiment, a columnar object color region 901 as shown in FIG. 8 is set in the YCbCr space based on object color information (ObjY, ObjCb, ObjCr) calculated by the object color calculation unit 202.

Referring to FIG. 8, the object color region 901 is a column having the object color (ObjCb, ObjCr) as a center and a radius ObjR on the Cb-Cr color plane. ObjR is a predetermined value. ObjYmax and ObjYmin indicating the height of the column can be obtained in accordance with, for example, equation (3):

$$\text{Obj}Y\text{max}=\text{Obj}Y+\Delta h$$

$$\text{Obj}Y\text{min}=\text{Obj}Y-\Delta h \quad (3)$$

where Δh is a predetermined constant, and ObjY is the luminance component of the object color calculated by the object color calculation unit 202.

If the pixel of interest falls within the object color region 901, it is determined in step S805 that the pixel of interest is positioned near the object color (YES in step S805), and a member corresponding to the position of the pixel of interest in the map MAP[y] [x] is set to "2" in step S806. After that, it is determined in step S807 whether the processing has ended for all pixels, and the processes in steps S802 to S807 are repeated until the processing has ended for all pixels. In the generated map, a pixel having "1" is specified as a gray pixel, and one having "2" is specified as a skin color pixel.

Note that the skin color region is explained as a column as shown in FIG. 8 in the first embodiment for descriptive convenience, but the embodiment is not limited to this. For example, even a sphere having a calculated object color as a center and the radius ObjR, or another similar shape also fall within the scope of the embodiment.

If the gray/skin color pixel map is generated, the light source estimation unit 204 estimates a capturing light source in steps S503 to S507 of FIG. 5. Although the embodiment does not particularly limit the light source estimation method, a method described in Japanese Patent Laid-Open No. 2002-152772 will be employed. In Japanese Patent Laid-Open No. 2002-152772, color balance correction of a general camera is executed by multiplying R, G, and B components by adjustment gains. Image data obtained by this adjustment exhibits a behavior different from that of image data obtained from the spectral distribution characteristic of the camera.

More specifically, the locus of gray and the skin color that is calculated from the spectral characteristic of a camera under various light sources is defined as a blackbody locus. In the camera, gray and the skin color are distributed on the blackbody locus before color balance correction. However, after the R, G, and B components are multiplied by predetermined gains to perform color balance correction within the camera, the distribution of gray and the skin color in the resultant image deviates from the blackbody locus.

By using this characteristic, the image having undergone color balance correction is multiplied by various coefficients to perform inverse conversion of the color balance correction for each pixel. The pixels of the inversely converted image are plotted on the blackbody locus plane, and the number of pixels near the blackbody locus of gray and the skin color is counted. A case in which the number of counted pixels becomes maximum corresponds to a state of capturing before color balance correction. The capturing light source is determined based on a blackbody locus position where a largest number of gray and skin color pixels are distributed (see Japanese Patent Laid-Open No. 2002-152772 for more detail).

The processes in steps S503 to S507 will be explained with reference to Japanese Patent Laid-Open No. 2002-152772. As described above, in step S503, the light source estimation unit 204 multiplies the R, G, and B components of the pixel of interest in the reduced image by various inverse conversion coefficients r, g, and b to perform inverse conversion of color balance correction executed in the camera, obtaining R', G', and B':

$$R'=R \times r$$

$$G'=G \times g$$

$$B'=B \times b \quad (4)$$

In the embodiment, however, the inverse conversion is executed only when it is determined in step S503 that the pixel of interest is a gray or skin color pixel by referring to the foregoing gray/skin color pixel map, unlike Japanese Patent Laid-Open No. 2002-152772. The method of the embodiment estimates the light source while excluding pixels other than gray and skin color ones. This method can increase the light source estimation precision and shorten the processing time taken to estimate the light source, compared to Japanese Patent Laid-Open No. 2002-152772 using all pixels in an image to be processed.

In step S504, the light source estimation unit 204 converts the R', G', and B' components into predetermined color components, and calculates the distance of a point indicated by the color components from a predetermined blackbody locus on a predetermined color plane. If the distance is equal to or smaller than a predetermined value, the light source estimation unit 204 determines that the inversely converted R', G', and B' values are positioned near the blackbody locus, and counts up the number of pixels.

By executing the processes in steps S503 and S504 for all the pixels of the reduced image, the number of pixels near the blackbody locus can be calculated for a given inverse conversion coefficient set (r, g, b) (step S505). Further, the light source estimation unit 204 repetitively performs the processes in steps S503 to S505 for various inverse conversion sets prepared in advance (step S506).

In step S507, the light source estimation unit 204 calculates and stores an inverse conversion set (r_max, g_max, b_max) which maximizes the number of pixels near the blackbody locus. The color temperature K of the capturing light source is determined in accordance with the distribution of skin color and gray pixels on the blackbody locus at the determined inverse conversion set (see Japanese Patent Laid-Open No. 2002-152772 for more detail). The unit K is kelvin, and a value of about 2,500 to 10,000 is held in general. The color temperature K is often about 5,500 K when the capturing light source is daylight, about 3,000 K when it is an orange light source such as an incandescent lamp, and about 8,000 K under a cloudy sky or in the shade. The light source estimation unit 204 has been described.

(Details of Each Unit: First Color Conversion)

The first color conversion unit 205 in FIG. 2 will be described. The first color conversion unit 205 performs color conversion to cancel color balance correction executed in the camera for the input image 200. In the embodiment, the first color conversion can be executed by multiplying the R, G, and B component values of each pixel in the input image 200 by a stored inverse conversion set (r_max, g_max, b_max). Note that the first color conversion unit 205 may perform color conversion to weaken color balance correction executed in the camera.

(Details of Each Unit: Second Color Conversion)

The second color conversion unit 206 in FIG. 2 performs the second color conversion. The second color conversion is to perform color balance correction considering the human visual characteristic, based on the color temperature of the estimated capturing light source for an image in which color balance correction executed in the camera has been canceled or weakened by executing the first color conversion by the first color conversion unit 205. In this case, "weaken" means canceling only part of applied color balance correction, or making all values converted by color balance correction to come close to original values.

An example of color balance correction will be exemplified using CIECAM02. CIECAM02 is a color appearance model established in 2002 by the CIE. In CIECAM02, the adaptation rate D can be set as an input parameter in correspondence with chromatic adaptation which is a human visual characteristic, in addition to those concerning observation conditions (for example, c, Nc, F, and the X, Y, and Z values of the white point of the observation light source).

By using these parameters, parameters corresponding to observation condition A are set, and the input image 200 is converted from the XYZ color space into a JCh color space independent of the observation condition. Another observation condition B is further designated, and the JCh color space is converted into the XYZ color space. As a result, the same "appearance" can be reproduced under the two observation conditions. CIECAM02 is described in various references such as "CIE Publication, TC8-01, 'A Color Appearance Model for Colour Management Systems'". See these references for more detail, and the embodiment describes only the outline.

Figure 9:
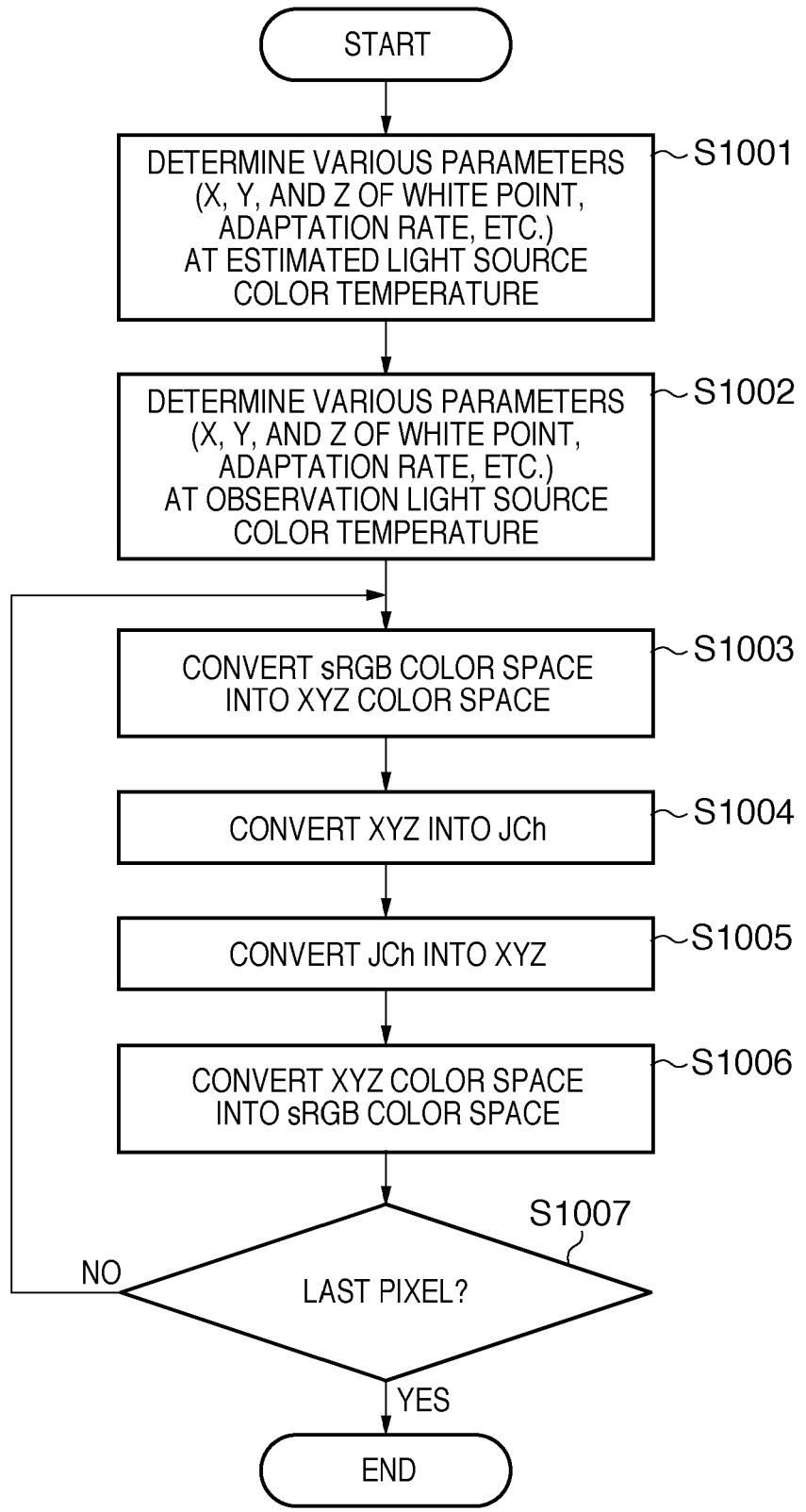
FIG. 9 is a flowchart of the second color conversion unit according to the first embodiment.

The embodiment will explain a method of reproducing "appearance" under the capturing light source under a predetermined observation condition (for example, monitor or printed material) using CIECAM02. FIG. 9 shows the processing sequence of the second color conversion unit 206. This method will be explained along the sequence.

Figures 10, 11:
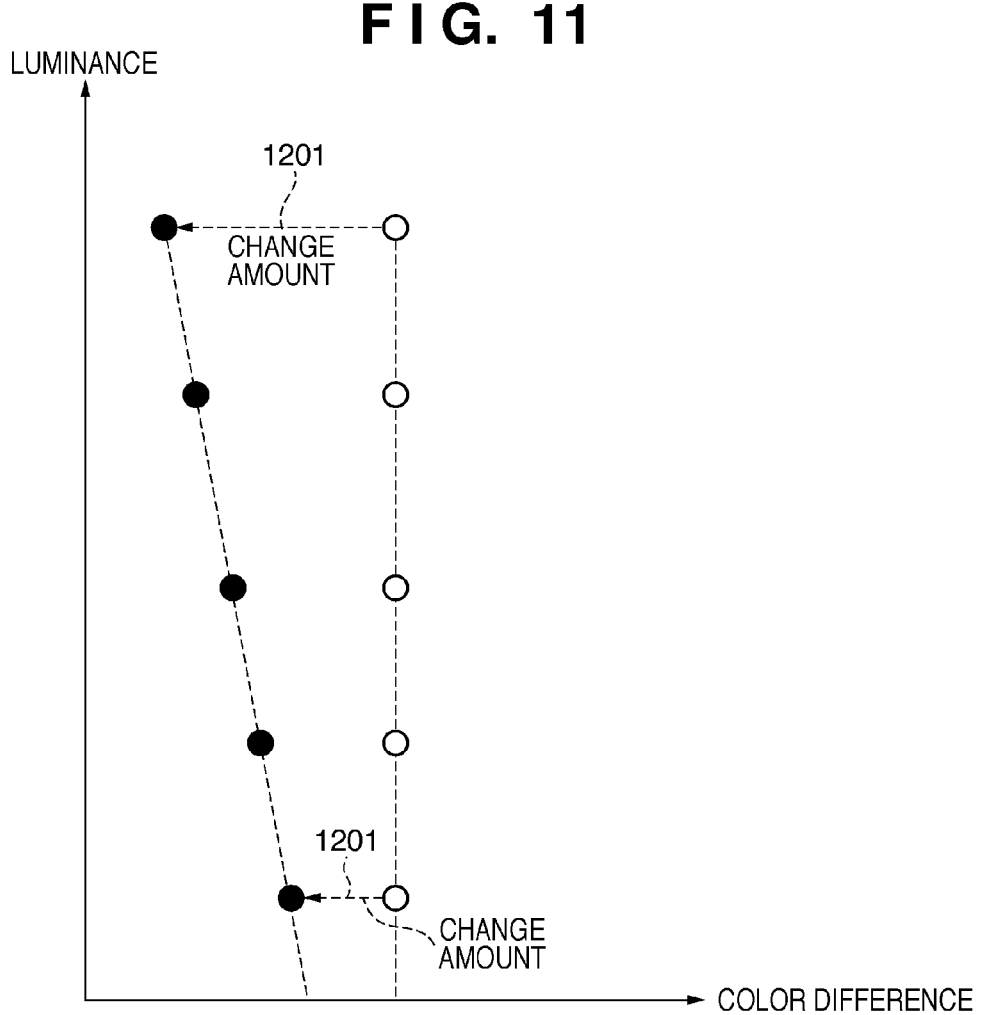
FIG. 10 is a table exemplifying holding of white point information under various light sources.
FIG. 11 is a graph for explaining the conversion amount before and after the second color conversion.

In step S1001 of FIG. 9, the second color conversion unit 206 calculates various parameters in accordance with the color temperature of the capturing light source estimated by the light source estimation unit 204. Main parameters are the X, Y, and Z values of the white point under the capturing light source, and the adaptation rate Din. As for the X, Y, and Z values of the white point, for example, Y, Cb, and Cr values at main color temperatures are stored in advance as shown in FIG. 10. Y, Cb, and Cr values at an estimated color temperature can be obtained by interpolation calculation. For example, when the estimated color temperature is 3,750 K, it is an intermediate value between 2,000 K and 5,500 K, and thus the Y, Cb, and Cr values of the white point are (255, −15, 15).

The obtained Y, Cb, and Cr values of the white point can be converted into X, Y, and Z values through the sRGB color space in accordance with a known conversion equation. In step S1001, the second color conversion unit 206 also determines the adaptation rate Din for the capturing light source. The adaptation rate Din may be set based on a preset fixed value (for example, Din=0.8).

The second color conversion unit 206 calculates parameters under the estimated capturing light source in step S1001, and in step S1002, determines parameters in an observation environment in which the input image 200 is observed. The observation environment is, for example, the monitor 111. As is well known, the white point of a sRGB monitor is set to D65, which corresponds to (255, 0, 0) in the YCbCr space. These values are similarly converted into X, Y, and Z values, obtaining X, Y, and Z in the observation environment. Similar to step S1001, the adaptation rate Dout in the observation environment can be determined based on a preset fixed value or the like.

In the embodiment, the coordinates of the white point under each light source are held in the YCbCr space for descriptive convenience, but the embodiment is not limited to this. For example, typical coordinates may be held in the XYZ space, sRGB space, CIE L*a*b* space, or the like. Instead of holding the typical coordinates, the coordinates of the white point can be expressed by a formula in a predetermined color space. The embodiment can adopt coordinates of any type.

In step S1003 of FIG. 9, the second color conversion unit 206 converts the R, G, and B values (sRGB color space in the embodiment) of the pixel of interest in the input image into values in the XYZ color space in accordance with a known conversion equation. In step S1004, the second color conversion unit 206 converts the XYZ color space into the JCh color space in accordance with a conversion equation described in a known reference of CIECAM02 by using parameters (X, Y, and Z of the white point, and Din) under the capturing light source that have been calculated in step S1001.

In step S1005, the second color conversion unit 206 converts JCh values into X', Y', and Z' values in accordance with a conversion equation described in a known reference of CIECAM02 by using parameters (X, Y, and Z of the white point, and Dout) in the observation environment that have been calculated in step S1002. In step S1006, the second color conversion unit 206 converts the X', Y', and Z' values into values in the sRGB color space using a known conversion equation, obtaining corrected pixel values R', G', and B' values. While moving the position of the pixel of interest, the second color conversion unit 206 executes the processes in steps S1003 to S1006 for the entire input image (step S1007). As a consequence, a state close to "appearance" perceived in capturing can be reproduced on the monitor 111 serving as the observation environment.

(Processing Result)

The characteristic of an image obtained as a result of applying the above-described processing will be explained with reference to FIG. 11. In FIG. 11, the abscissa indicates the color difference, and the ordinate indicates the luminance. Open circles represent the gray axis of a color fog image input to the second color conversion unit 206, and closed circles represent pixel values after the second color conversion. The open circles exist at positions deviated from the luminance axis owing to the color fog.

By performing the second color conversion for pixels indicated by the open circles, the axis of the open circles is corrected toward the luminance axis, that is, the achromatic color direction, because of the human adaptation function. However, the correction amount (change amount 1201) becomes larger toward the bright part region (high luminance) and smaller toward the dark part region (low luminance).

More specifically, when attention is paid to a plurality of pixels having the same hue and the same saturation among input pixel values, the amount of change by the second color conversion becomes larger for a bright pixel than for a dark pixel. This is based on a human visual characteristic in which the adaptation rate is higher for a bright part than for a dark part. This processing can reproduce an image closer to "appearance" in capturing, compared to conventional processing.

By setting the adaptation rates Din and Dout to be lower than 1.0, the incomplete adaptation state, which is important among human visual characteristics, can be taken into consideration. An image closer to "appearance" in capturing can be reproduced in comparison with conventional processing.

Second Embodiment

As the inverse conversion method (step S503) in the light source estimation unit 204, the first embodiment has described only a method of multiplying, by inverse conversion coefficients, the R, G, and B component values of a pixel determined to be a gray or skin color pixel in a reduced image. This method can execute inverse conversion of color balance correction executed in the camera, but imposes a limitation on inverse conversion of another image processing element.

For example, the brightness is controlled within the camera, in addition to the above-described color balance correction. This control is sometimes done by adding predetermined gains to R, G, and B components. To inversely convert image processing including the brightness control within the camera, an inverse conversion equation containing an addition element together with a multiplication element, as represented by equation (5), is defined instead of equation (4) described in the first embodiment:

$$R' = R \times r + r1$$

$$G' = G \times g + g1$$

$$B' = B \times b + b1 \quad (5)$$

This equation includes six inverse conversion coefficients r, g, b, r1, g1, and b1. While changing these coefficients at predetermined intervals, the inverse conversion in step S503 is executed, increasing the light source estimation precision, compared to the first embodiment. As the predetermined intervals, for example, an interval of 0.1 is designated within the range of 0.5 to 1.5 for r, g, and b, and an interval of 1 is designated within the range of −10 to +10 for r1, g1, and b1. However, the embodiment is not limited to this.

As image processing in the camera, image processing using nonlinear elements is sometimes done for the R, G, and B components. In this case, inverse conversion may be executed using equation (6) in place of equation (5):

$$R'=R\times r^{r2}$$

$$G'=G\times g^{g2}$$

$$B'=B\times b^{b2} \quad (6)$$

where r2, g2, and b2 are factorial coefficients. Equation (6) includes six inverse conversion coefficients r, g, b, r2, g2, and b2. While changing these coefficients at predetermined intervals, the inverse conversion in step S503 is executed, increasing the light source estimation precision, compared to the first embodiment.

Third Embodiment

As the first color conversion by the first color conversion unit 205, the first embodiment has described a method of multiplying the input image 200 by the coefficients r_max, g_max, and b_max obtained by inverse conversion processing. The third embodiment will explain a method of performing the first color conversion using an object color detected by an object color calculation unit 202. Even in the third embodiment, the object to be processed is a human face region for descriptive convenience.

FIG. 12 is a flowchart of the first color conversion in the third embodiment. In step S1301 of FIG. 12, an object color (in this case, the skin color of a person) at an estimated color temperature is calculated using the color temperature estimated by a light source estimation unit 204.

Figure 13A:
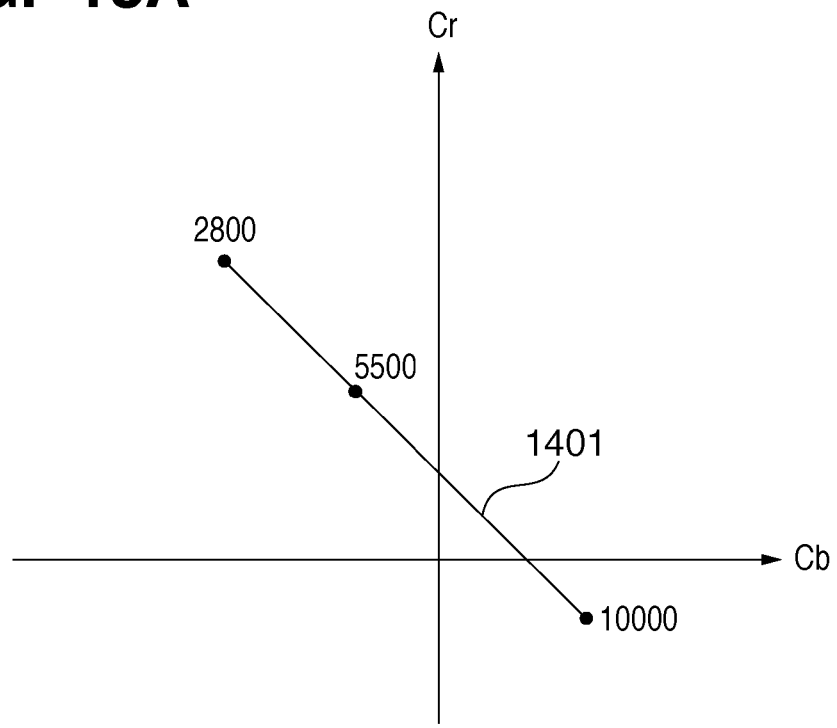
FIGS. 13A and 13B are graphs for explaining the locus of the skin color and the shift vector according to the third embodiment.

A locus 1401 in FIG. 13A is the locus of the skin color of a person obtained when the illumination color temperature is changed on the Cb-Cr color plane. A numerical value at each point in FIG. 13A indicates a color temperature. Along this locus, the skin color position is proper at a color temperature of 5,500 K, and shifts toward orange at low color temperature and blue at high color temperature. In step S1301, a skin color corresponding to the estimated color temperature value is calculated by referring to this locus.

As the estimated color temperature value calculation method, it is also possible to hold, as a linear expression, a skin color locus on the Cb-Cr plane as shown in FIG. 13A, and calculate a skin color using an estimated color temperature value and the held linear expression. Alternatively, skin color values at several typical color temperatures on the Cb—Cr plane may be held in advance to obtain a skin color corresponding to an estimated color temperature value by interpolation calculation using typical values.

In steps S1302 to S1305, the first color conversion processing in the third embodiment is done for each pixel of the input image. In the first color conversion processing of the third embodiment, the R, G, and B values (PixR, PixG, PixB) of the pixel of interest are converted into Y, Cb, and Cr values (PixY, PixCb, PixCr) in step S1302.

Figure 13B:
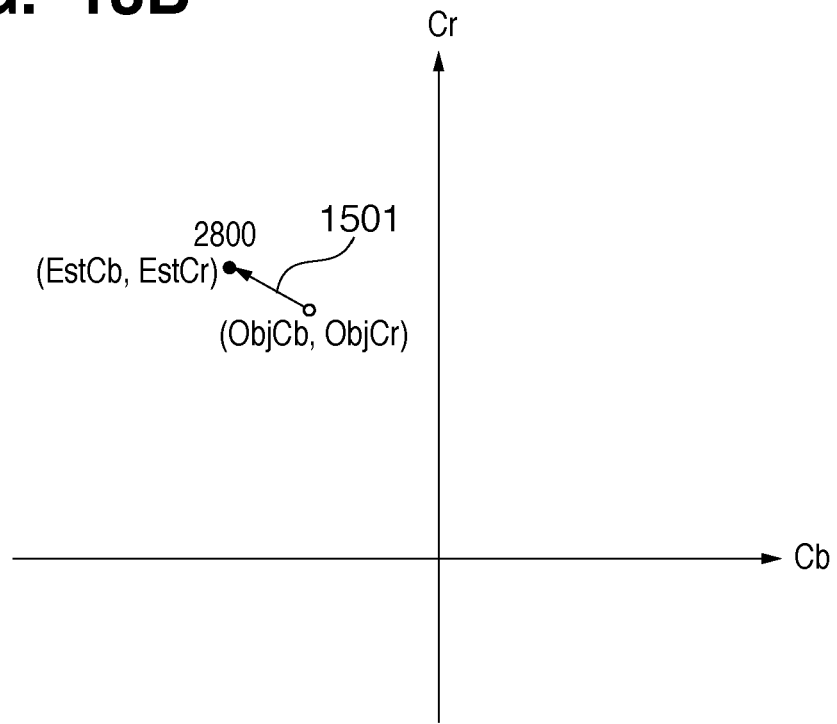

In step S1303, color shift processing is done in the YCbCr color space. The color shift processing is executed based on a shift vector 1501 shown in FIG. 13B. In FIG. 13B, a closed circle indicates an object color at the estimated color temperature that has been calculated in step S1301, and an open circle indicates an object color in the image that has been calculated by the object color calculation unit 202. Since color balance correction has been executed in the camera, an object color originally at the closed circle has moved to a color at the open circle in an input image 200. To return the object color from the open circle to the closed circle, the third embodiment executes color shift processing in the YCbCr color space for each pixel of interest in accordance with equation (7):

$$PixCb'=PixCb+(EstCb-ObjCb)$$

$$PixCr'=PixCr+(EstCr-ObjCr) \quad (7)$$

Figure 14A:
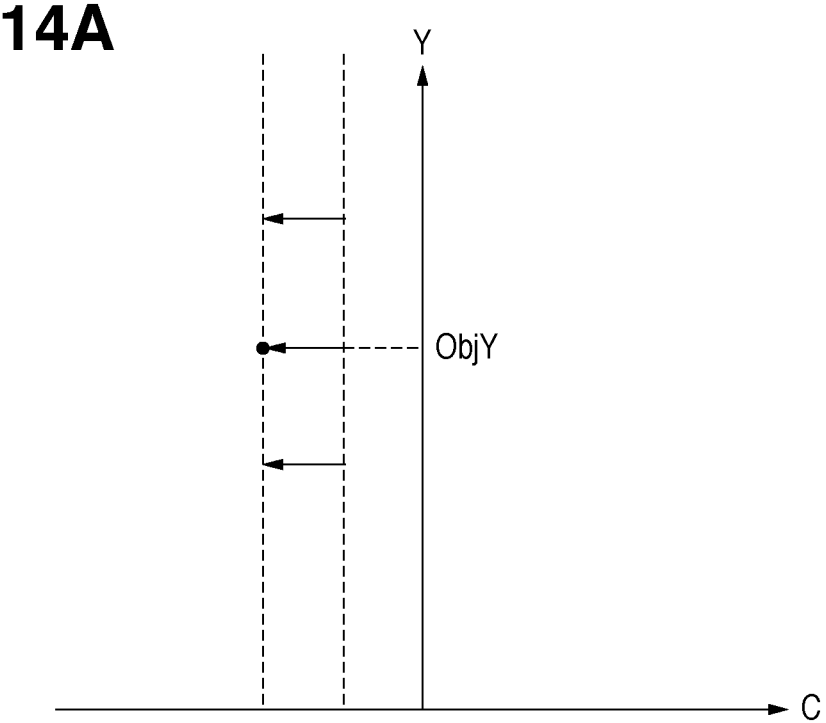
FIGS. 14A and 14B are graphs for explaining color shift processing according to the third embodiment.

By using equation (7), all pixels of interest (open circles) can be shifted in the same direction in the YCbCr space, as shown in FIG. 14A. In FIG. 14A, the ordinate indicates the luminance, and the abscissa indicates the color difference.

In step S1304, the pixel values (PixY, PixCb', PixCr') after color shift are converted again into those in the RGB space, and the converted R, G, and B values (PixR', PixG', PixB') are output as pixel values having undergone the first color conversion. Note that color shift can also be done in accordance with equation (8):

$$PixCb'=PixCb+(EstCb-ObjCb)\times W$$

$$PixCr'=PixCr+(EstCr-ObjCr)\times W \quad (8)$$

where W is
for PixY<ObjY, W=PixY/ObjY
for PixY≥ObjY, W=(255−PixY)/(255−ObjY)

Figure 14B:
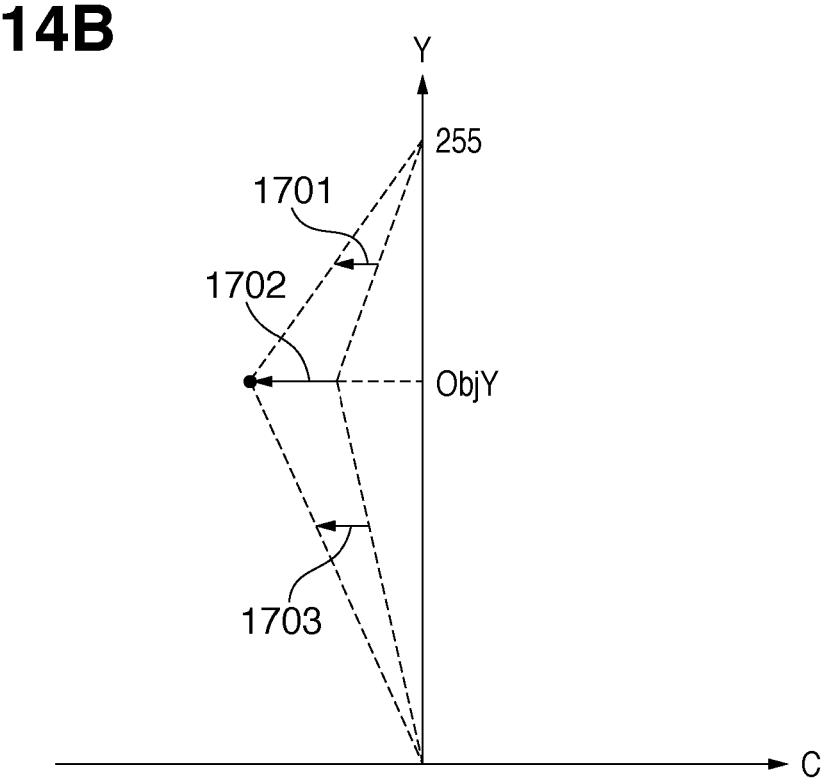

Equation (8) means that the luminance value PixY of the pixel of interest is compared with the luminance value ObjY of the object, and if the luminance is 0 or as it comes close to 255, the shift amount is reduced. FIG. 14B shows a shift vector in this case. Referring to FIG. 14B, the length of the shift vector becomes shorter as the luminance decreases or increases using the ObjY position as a reference, as represented by shift vectors 1701 to 1703. The first color conversion processing using these shift vectors also falls within the scope of the embodiment.

As described above, the third embodiment implements the first color conversion processing by color shift processing in a predetermined luminance/color difference space. The method of multiplying R, G, and B values by the inverse conversion set (r_max, g_max, b_max) described in the first embodiment sometimes fails in accurate color conversion because the difference before and after conversion differs between a case in which the R, G, and B values of the pixel of interest are close to 0 and a case in which they are close to 255. However, the color shift method in the third embodiment can guarantee the variation amount not to exceed a predetermined amount in the color space, and thus can solve the above problem.

Fourth Embodiment

In the first embodiment, the adaptation rates Din and Dout in the second color conversion unit 206 are set to predetermined fixed values. In the fourth embodiment, especially the adaptation rate Din of the capturing light source is changed using an estimated capturing color temperature.

Figure 15A:
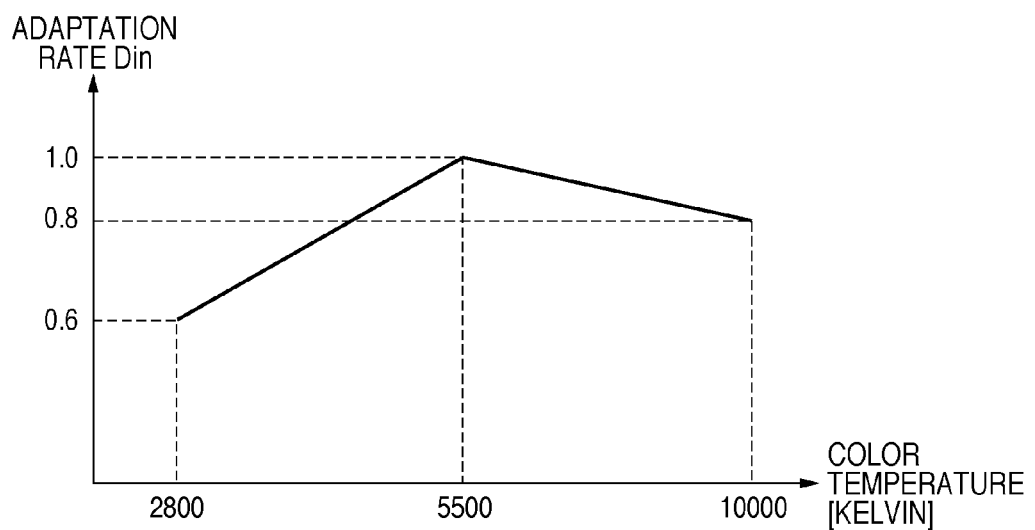
FIGS. 15A and 15B are graphs exemplifying the setting of the adaptation rate according to the fourth embodiment.

FIG. 15A is a graph for explaining a method of setting the adaptation rate Din in the fourth embodiment. In the fourth embodiment, the adaptation rate is set slightly lower for a lower estimated color temperature in accordance with a capturing color temperature estimated by a light source estimation unit 204 such that the adaptation rate is 0.6 for an estimated color temperature as low as 2,800 K and 0.8 for an estimated color temperature as high as 10,000 K. As is well known, examples of the light source having low color temperature are an incandescent lamp in the room, an evening glow, and a morning glow. Examples of the light source having high color temperature are a cloudy sky or the shade under a clear sky.

In these general examples, the skin color of a person or the like undesirably becomes an almost achromatic color in a scene in which the color temperature is high. It is, therefore, desirable to set high adaptation rate and positively perform color balance correction. Even the skin color of a person that is close to an achromatic color is corrected to a healthy, appropriate skin color.

To the contrary, scenes in which the color temperature is low are often an evening glow scene and indoor party scene. In such a scene, positive color balance correction is not always preferable. For example, if the same adaptation rate as that for high color temperature is set to perform color balance correction in an evening glow scene, the resultant image becomes a daytime image, greatly impairing the atmosphere in capturing.

To prevent this, as shown in FIG. 15A, the adaptation rate is increased to enhance the correction effect as the color temperature rises up to a color temperature of 5,500 K for the skin color, and is decreased as the color temperature decreases. Similarly, when the color temperature exceeds 5,500 K, the adaptation rate Din is decreased as the color temperature further rises. By maintaining the atmosphere in capturing by this method, more preferable image reproduction suited to each scene can be provided.

As the Din setting method, a linear equation shown in FIG. 15A which represents the change rate may be held to calculate Din using an estimated color temperature and the held linear equation. Alternatively, only the Din values of main color temperatures may be stored to obtain a Din value corresponding to an estimated color temperature by interpolation calculation.

Figure 15B:
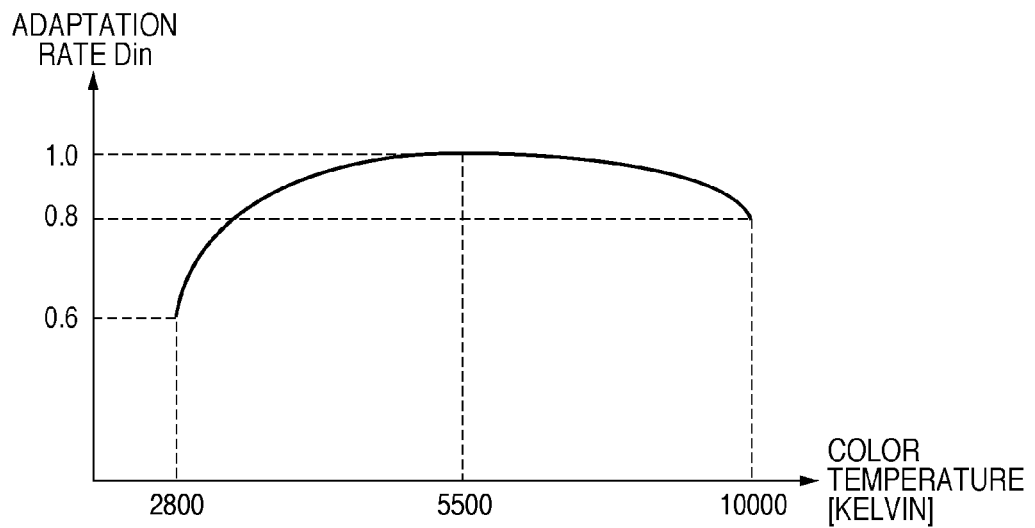

The equation indicating the change rate is not limited to the linear equation, and even calculation based on a quadratic curve as shown in FIG. 15B, a cubic curve, or another non-linear curve falls within the scope of the embodiment. Even in this case, the adaptation rate Din which peaks at a color temperature of 5,500 K is obtained.

Fifth Embodiment

The first embodiment has exemplified processing of performing the first color conversion and then the second color conversion for the input image 200, as shown in FIG. 2. However, a long processing time is taken to series-connect different processes and execute complicated calculation processing for each pixel in each process.

Figure 16:
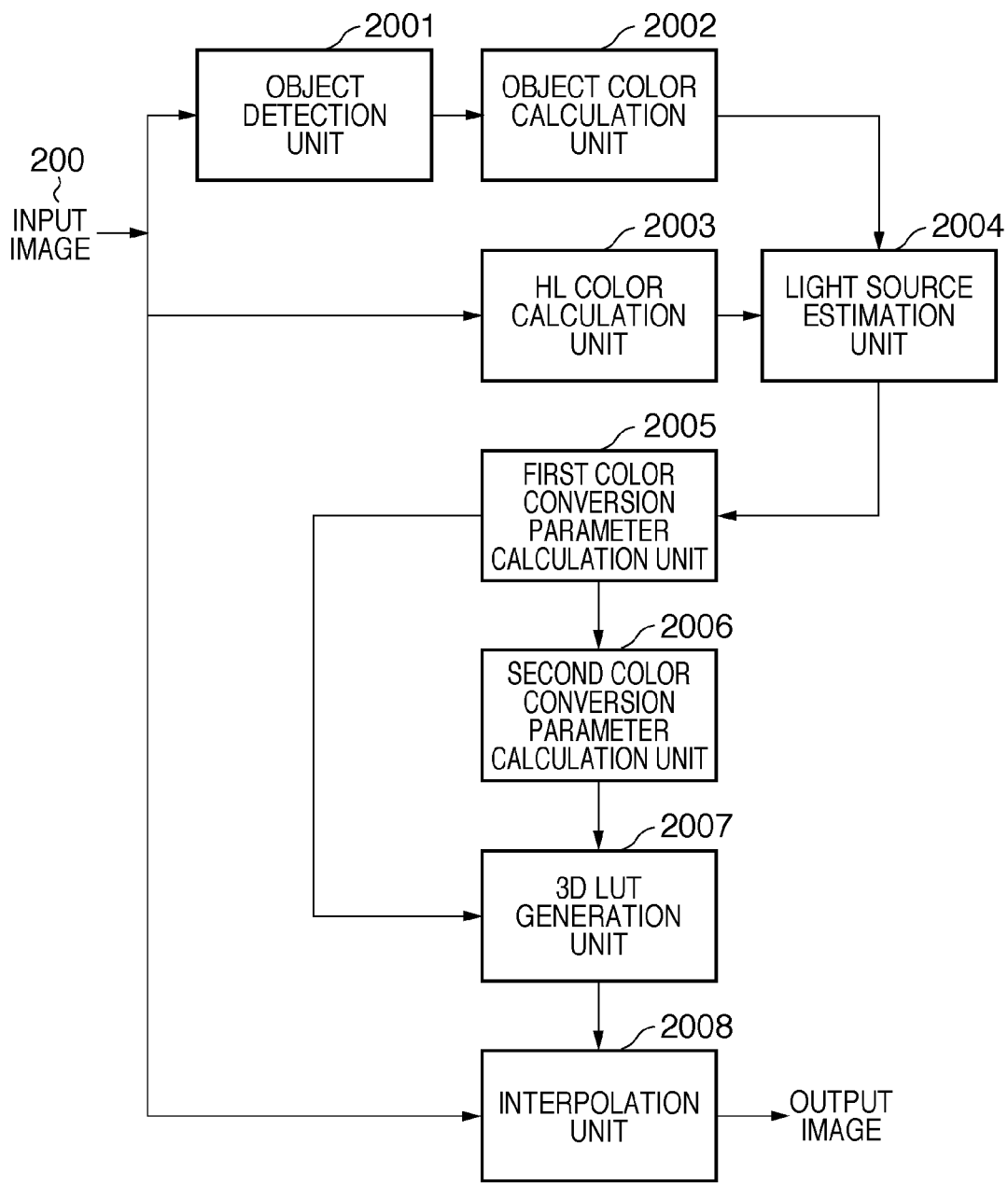
FIG. 16 is a functional block diagram according to the fifth embodiment.

To prevent this, the fifth embodiment will propose a method of performing processes using the arrangement of blocks as shown in FIG. 16. More specifically, parameters necessary for the first and second color conversion processes are calculated in advance, a three-dimensional lookup table (to be referred to as 3D LUT) which reflects these parameters is calculated, and the 3D LUT is applied to an input image using interpolation calculation. The processes of processing units 2001 to 2004 in FIG. 16 are the same as those in the first embodiment, and a description thereof will not be repeated.

A first color conversion parameter calculation unit 2005 determines an image processing parameter to cancel WB correction executed in the camera, similar to one described in the first embodiment, thereby implementing the first calculation unit. According to the first embodiment, the inverse conversion set (r_max, g_max, b_max) which maximizes the number of gray and skin color pixels near the blackbody locus calculated by the light source estimation unit 2004 is directly determined as an image processing parameter, and input to a 3D LUT generation unit 2007.

Then, a second color conversion parameter calculation unit 2006 determines parameters necessary for the second color conversion, similar to one described in the first embodiment, thereby implementing the second calculation unit. Parameters necessary for the second color conversion are parameters (X, Y, and Z values of the white point at the estimated color temperature, and the adaptation rate Din) concerning the capturing light source, and parameters (X, Y, and Z values of the white point in the observation environment, and the adaptation rate Dout) concerning the observation environment. These parameters are calculated by the same method as that in the first embodiment, and input to the 3D LUT generation unit 2007.

(Generation of 3D LUT)

Processing by the 3D LUT generation unit 2007 will be explained with reference to the flowchart of FIG. 17. In the fifth embodiment, a 3D LUT having R, G, and B components each for 17 grids (total number of grids=17^3=4,913) in the sRGB space is generated for descriptive convenience. However, the embodiment is not limited to this.

Figure 17:
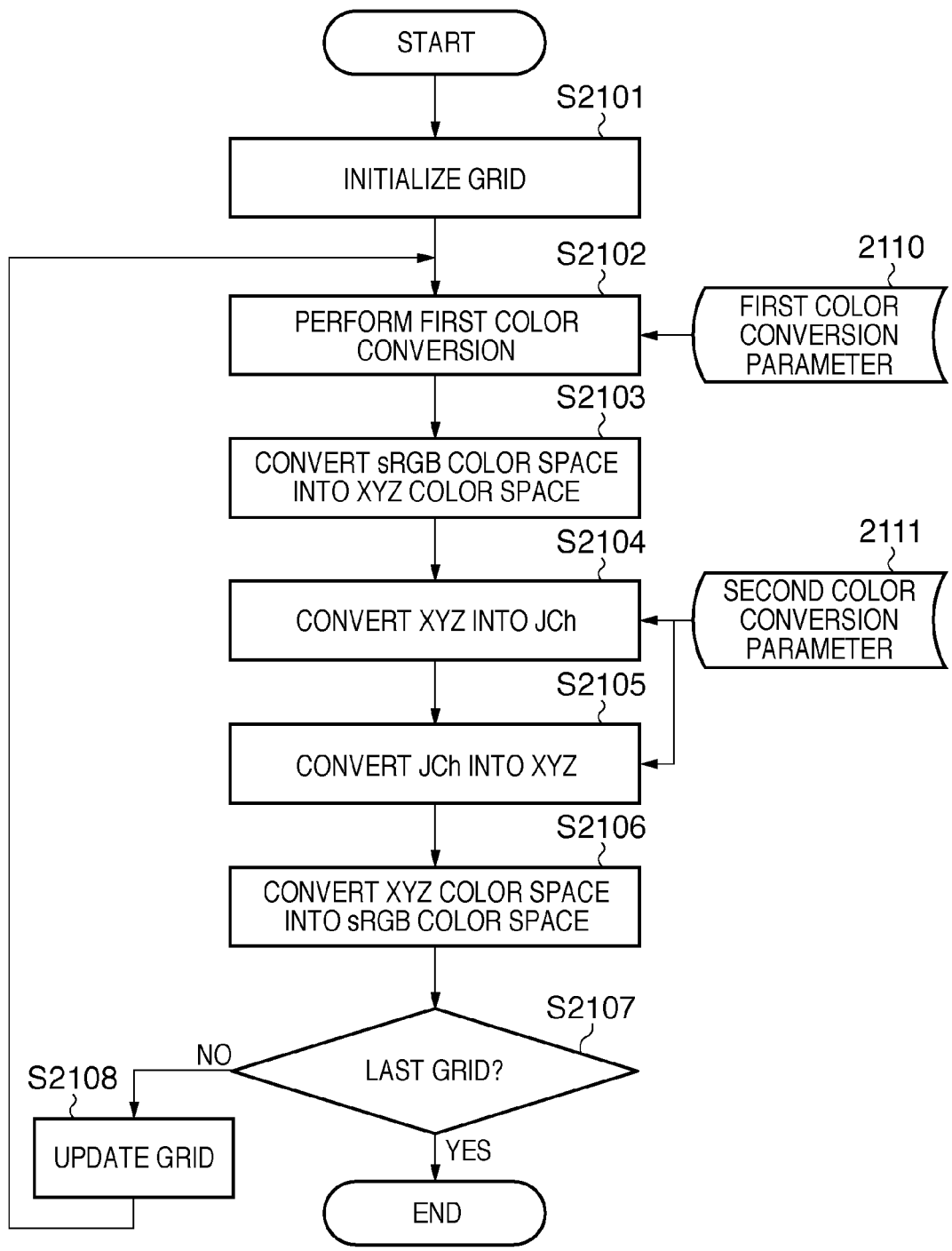
FIG. 17 is a flowchart of a 3D LUT generation unit according to the fifth embodiment.

In step S2101 of FIG. 17, the respective grids are initialized. That is, the R, G, and B values are set to 0. In step S2102, the first color conversion is performed using a first color conversion parameter 2110. More specifically, R', G', and B' values after the first color conversion are calculated in accordance with equation (9):

$$R' = R \times r\_max$$

$$G' = G \times g\_max$$

$$B' = B \times b\_max \qquad (9)$$

In step S2103, the calculated R', G', and B' values are converted into X, Y, and Z values using a known conversion equation. In step S2104, the X, Y, and Z values are converted into values in the JCh space using CIECAM02, as described in the first embodiment. In step S2105, the JCh space is converted into the XYZ space. At this time, a second color conversion parameter 2111 is used.

In step S2106, similar to the first embodiment, the X, Y, and Z values after the second color conversion are converted into values in the sRGB color space, which are stored in the 3D LUT as the output value of the grid of interest.

This processing is executed for all R, G, and B grids, and the output values of the respective grids are stored in the 3D LUT. More specifically, if an unprocessed grid remains after the end of the processes in steps S2102 to S2106 (NO in step S2107), the B component value is incremented by 16 in step S2108. If the B component value exceeds 255, the G component value is incremented by 16, the B component value is reset to 0, and then the processing continues. Further, if the G component value exceeds 255, the R component value is incremented by 16, and the G and B component values are reset to 0.

In the 3D LUT for 17 grids, the above processing is repeated by 4,913 times (=17^3). When all the R, G, and B component values exceed 255, it is determined that output values for all the grids have been calculated (YES in step S2107), and the processing ends.

An interpolation unit 2008 receives the 3D LUT generated by the above processing, and applies a known interpolation method (details of which will be omitted) for the similarly received input image 200, obtaining a corrected image. As the interpolation method, various methods are proposed, including tetrahedron interpolation and cubic interpolation. In the embodiment, the interpolation method is arbitrary.

As described above, in the fifth embodiment, output values are calculated using the first and second color conversion parameters calculated in advance for limited grid positions in the sRGB color space, and held as a 3D LUT. The input image 200 is then converted by interpolation calculation using the 3D LUT. Especially when the resolution of an input image is high, an output image can be obtained within a very short processing time, compared to executing complicated color conversion processing for each pixel.

Note that the first color conversion parameter calculation unit 2005 in the fifth embodiment may use a shift vector as described in the third embodiment. More specifically, a shift vector value is input to the 3D LUT generation unit 2007 to implement color shift processing in step S2102 by the 3D LUT generation unit 2007 by the same method as that in the third embodiment.

The fifth embodiment has explained processing of generating a 3D LUT based on the three, R, G, and B components for descriptive convenience, but the embodiment is not limited to this. For example, when the input image format is formed from four, C, M, Y, and K components, processing can also be done using a 4D LUT according to the fifth embodiment. That is, even processing using a multi-dimensional LUT falls within the scope of the embodiment.

Other Application Examples

The input image may not be an image captured by a digital camera. An image obtained by converting a digital image input from a digital camera or the like to have a resolution for display or printing may be used as an input image to perform the above-described processing.

In the above description, the work color space for an input image and processing is the sRGB color space, but the embodiment is not limited to this. The AdobeRGB (trademark in Adobe U.S.) color space may be used as the work color space, or another color space such as the CIE L*a*b* color space is also usable.

Object detection has been described using the human face region, but the embodiment is not limited to this. For example, detection of an animal, building, or another object also falls within the scope of the embodiment.

The present invention may be applied to a system including a plurality of devices (for example, a host computer, interface device, reader, and printer), or an apparatus (for example, a printer, copying machine, or facsimile apparatus) formed by a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118771, filed May 24, 2010, which is hereby incorporated by reference herein in its entirety.

What is claimed is:

1. An image processing apparatus comprising:
an estimation unit configured to estimate a color temperature of a capturing light environment of an image based on a highlight color of the image;
a first color conversion unit configured to perform first color conversion for the image based on the color temperature estimated by the estimation unit; and
a second color conversion unit configured to perform second color conversion for the image having undergone the first color conversion by said first color conversion unit, by using a degree of chromatic adaptation determined based on the color temperature of the capturing light environment estimated by the estimation unit,
wherein the degree of chromatic adaptation is decreased as a difference between the color temperature of the capturing light environment and a predefined color temperature increases, and
wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

2. The apparatus according to claim 1, wherein
said first color conversion unit includes an object color calculation unit configured to calculate a color of the object corresponding to a color temperature of the capturing light environment, based on the color temperature the capturing light environment estimated by said estimation unit and locus of a skin color, and
said first color conversion unit performs the first color conversion based on the color of the object that has been calculated by said object color calculation unit, and the color of the object included in the image.

3. The apparatus according to claim 2, wherein a shift amount of color conversion performed for a pixel included in the image by the first color conversion unit becomes lower as a luminance value of the pixel separates from a luminance value of an object included in the image.

4. The apparatus according to claim 1, wherein the degree of chromatic adaptation is defined to set an amount of change before and after the second color conversion to be larger for a pixel contained in a bright part region than for a pixel contained in a dark part region out of a plurality of pixels having the same hue and the same saturation in the image.

5. The apparatus according to claim 1, wherein said second color conversion unit performs the second color conversion using CIECAM02.

6. The apparatus according to claim 1, wherein the second color conversion unit performs the second color conversion by converting the image having undergone the first color conversion into a JCh color space.

7. The apparatus according to claim 1, wherein change amount by the second color conversion unit becomes larger as luminance of a pixel of the image becomes higher.

8. An image processing apparatus comprising:
an estimation unit configured to estimate a color temperature of a capturing light environment of an image based on a highlight color of the image;
a first calculation unit configured to calculate a first set of color conversion parameters based on the color temperature estimated by the estimation unit;
a second calculation unit configured to calculate a second set of color conversion parameters including a degree of chromatic adaptation determined based on the color temperature of the capturing light environment estimated by the estimation unit; and
a color conversion unit configured to perform color conversion for the image using the first set of color conversion parameters and the second set of color conversion parameters,
wherein the degree of chromatic adaptation is decreased as a difference between the color temperature of the capturing light environment and a predefined color temperature increases, and
wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

9. The apparatus according to claim 8, wherein the degree of chromatic adaptation is determined based on a human visual characteristic.

10. The apparatus according to claim 9, wherein said estimation unit includes
an object color calculation unit configured to calculate a color of an object included in the image, and
a specifying unit configured to specify a gray pixel and a skin color pixel of the object included in the image, based on the color of the object calculated by the object color calculation unit and the highlight color, and
said estimation unit estimates the color temperature of the capturing light environment of the image based on at least the specified gray pixel and skin color pixel.

11. The apparatus according to claim 10, wherein an object included in the image is a face.

12. The apparatus according to claim 8, wherein a decrease of the degree of chromatic adaptation is lower in a case where a color temperature under the capturing light environment is greater than or equal to a color temperature of a skin color than in a case where the color temperature under the capturing light environment is less than the color temperature of the skin color.

13. The apparatus according to claim 8, wherein the predefined color temperature is a color temperature of a skin color.

14. The apparatus according to claim 8, wherein the second set of color conversion parameters is further calculated by using a white point corresponding to the estimated color temperature of the capturing light environment.

15. The apparatus according to claim 8, wherein said second calculation unit calculates the second set of color conversion parameters using CIECAM02.

16. A non-transitory computer-readable medium storing a program for causing a computer to function as each unit of an image processing apparatus defined in claim 8.

17. A method of controlling an image processing apparatus, the method comprising:
an estimation step of estimating a color temperature of a capturing light environment of an image based on a highlight color of the image;
a first color conversion step of performing first color conversion for the image based on the color temperature estimated in the estimation step; and
a second color conversion step of performing second color conversion for the image having undergone the first color conversion in the first color conversion step, by using a degree of chromatic adaptation determined based on the color temperature of the capturing light environment estimated in the estimation step,
wherein the degree of chromatic adaptation is decreased as a difference between the color temperature of the capturing light environment and a predefined color temperature increases, and
wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

18. A method of controlling an image processing apparatus, the method comprising:
an estimation step of estimating a color temperature of a capturing light environment of an image based on a highlight color of the image;
a first calculation step of calculating a first set of color conversion parameters based on the color temperature estimated in the estimation step;
a second calculation step of calculating a second set of color conversion parameters including a degree of chromatic adaptation determined based on the color temperature of the capturing light environment estimated in the estimation step; and
a color conversion step of performing color conversion for the image using the first set of color conversion parameters and the second set of color conversion parameters,
wherein the degree of chromatic adaptation is decreased as a difference between the color temperature of the capturing light environment and a predefined color temperature increases, and
wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

19. An image processing apparatus comprising:
an estimation unit configured to estimate a color temperature of a capturing light environment of an image based on a highlight color of the image; and
a color conversion unit configured to perform color conversion for the image, by using a degree of chromatic adaptation determined based on the color temperature of the capturing light environment estimated by the estimation unit, wherein the degree of chromatic adaptation is decreased as a difference between the color temperature of the capturing light environment and a predefined color temperature increases, and wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

20. The apparatus according to claim 19, wherein the degree of chromatic adaptation is determined based on a human visual characteristic.

21. The apparatus according to claim 19, wherein said color conversion unit performs the color conversion using CIECAM02.

22. The apparatus according to claim 19, wherein change amount by the color conversion unit becomes larger as luminance of a pixel of the image becomes higher.

23. A method of controlling an image processing apparatus, the method comprising:

an estimation step of estimating a color temperature of a capturing light environment of an image based on a highlight color of the image; and a color conversion step of performing color conversion for the image, by using a degree of chromatic adaptation determined based on the color temperature of the capturing light environment estimated in the estimation step, wherein the degree of chromatic adaptation is decreased as a difference between the color temperature of the capturing light environment and a predefined color temperature increases, and wherein a decrease of the degree of chromatic adaptation according to the difference between the color temperature under the capturing light environment and the predefined color temperature is lower in a case where the color temperature under the capturing light environment is greater than or equal to the predefined color temperature than in a case where the color temperature under the capturing light environment is less than the predefined color temperature.

* * * * *